(12) United States Patent
Maeda et al.

(10) Patent No.: US 7,844,627 B2
(45) Date of Patent: Nov. 30, 2010

(54) PROGRAM ANALYSIS METHOD AND APPARATUS

(75) Inventors: Yoshiharu Maeda, Kawasaki (JP); Kuniharu Takayama, Kawasaki (JP); Kimio Tateishi, Kawasaki (JP); Hideyuki Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 176 days.

(21) Appl. No.: 11/476,632

(22) Filed: Jun. 29, 2006

(65) Prior Publication Data

US 2007/0214166 A1 Sep. 13, 2007

(30) Foreign Application Priority Data

Mar. 13, 2006 (JP) .............................. 2006-066909

(51) Int. Cl.
*G06F 17/30* (2006.01)
(52) U.S. Cl. ..................................................... 707/790
(58) Field of Classification Search .................... 707/5; 463/40; 705/40; 702/141
See application file for complete search history.

(56) References Cited

U.S. PATENT DOCUMENTS 6,009,267 A  12/1999  Ogawa
6,631,379 B2  10/2003  Cox
6,922,825 B1 *  7/2005  Kamakura et al. .......... 717/125
2005/0108649 A1  5/2005  Ueda

FOREIGN PATENT DOCUMENTS

JP  2003-157262  5/2003

* cited by examiner

*Primary Examiner*—Wilson Lee
*Assistant Examiner*—Sheree N Brown
(74) *Attorney, Agent, or Firm*—Fujitsu Patent Center

(57) ABSTRACT

This invention is to present specific information necessary for maintenance of programs in an information system. This program analysis method includes: storing an entity that is an information unit as an object of a processing in a program into a relation table in association with an event affecting a processing for the entity; calculating importance degrees of the events by using data stored in the relation table; and identifying an event affecting a processing for a specific entity by using the data stored in the relation table, and calculating an influence degree of the specific entity by using the importance degree of the identified event. Because the user can grasp the influence degree of the entity, it becomes easy to grasp how much the update of the entity affects other portion in the information system.

13 Claims, 21 Drawing Sheets

```
000100   PROGRAM-ID.    SAMPLE.
...
                                                      301
010100   MOVE 'REGISTRATION 1' TO SCREEN TYPE
010200   IF SCREEN TYPE = 'REGISTRATION 1' THEN
010300         READ FILE 1
010400   ELSE
010500         READ FILE 2
010600   END-IF.
010700   EXEC SQL UPDATE TABLE-A
010800         SET ITEM1 = :G-ITEM1
010900         WHERE CODE = :G-CODE
011000   END-EXEC.
...
100000   END PROGRAM   SAMPLE.
```

| EVENT TYPE | EVENT NAME |
|---|---|
| SCREEN | REGISTRATION 1 |
| FILE | FILE 1 |
| FILE | FILE A |
| FILE | FILE B |
| KEY OPERATION | INPUT 1 |
| ... | |

| NODE NO. | PARENT NODE NO. | PROGRAM ID | LINE NO. | TYPE | ATTRIBUTE 1 | VALUE 1 | ATTRIBUTE 2 | VALUE 2 | ... |
|---|---|---|---|---|---|---|---|---|---|
| 0 | — | SAMPLE | 000100 | — | SAMPLE | — | — | — | |
| 1 | 0 | SAMPLE | 010100 | MOVE | OBJECT | 'REGISTRATION 1' | DESTINATION | SCREEN TYPE | |
| 2 | 0 | SAMPLE | 010200 | IF | CONDITION | SCREEN TYPE='REGISTRATION 1' | — | — | |
| 3 | 2 | SAMPLE | 010300 | THEN | — | | — | — | |
| 4 | 3 | SAMPLE | 010400 | READ | OBJECT | FILE 1 | — | — | |
| 5 | 2 | SAMPLE | 010500 | ELSE | — | | — | — | |
| 6 | 5 | SAMPLE | 010600 | READ | OBJECT | FILE 2 | — | — | |
| 7 | 0 | SAMPLE | 010700 | EXEC | OBJECT | TABLE-A | PROCESSING | UPDATE | |
| ... | | | | | | | | | |

FIG.5

| PROGRAM | | EVENT | | | ENTITY | | |
|---|---|---|---|---|---|---|---|
| PROGRAM | CALLED SUBROUTINE | READ FILE | SCREEN | KEY OPERATION | TARGET TABLE | LINE NO. | PROCESSING |
| SAMPLE | — | — | REGISTRATION 1 | — | TABLE-A | 010700 | UPDATE |
| ... | | | | | | | |
| PROGRAM-1 | PROGRAM-2 | FILE-1 | — | — | TABLE-1 | 11 | SELECT |
| PROGRAM-1 | PROGRAM-2 | FILE-1 | GAMEN-1 | — | TABLE-1 | 22 | UPDATE |
| PROGRAM-2 | — | — | — | — | TABLE-1 | 132 | SELECT |
| PROGRAM-2 | — | — | — | — | TABLE-1 | 216 | UPDATE |
| PROGRAM-3 | PROGRAM-2 | FILE-2 | GAMEN-2 | — | TABLE-1 | 257 | INSERT |
| PROGRAM-4 | PROGRAM-2 | FILE-3 | | | TABLE-1 | 266 | SELECT |
| ... | | | | | | | |
| PROGRAM-9 | PROGRAM-8 | FILE-3 | | | TABLE-3 | 300 | UPDATE |
| ... | | | | | | | |
| | | | | | | 321 | UPDATE |

FIG.10

| VARIABLE NAME /4011 | BRANCH CONDITION /4031 | VALUE /4051 |
|---|---|---|
| SCREEN TYPE | NONE | REGISTRATION 1 /-4101 |
| VARIABLE XXX | VARIABLE ZZZ=5 | 5 /-4111 |
| VARIABLE XXX | VARIABLE ZZZ<>5 | 3 /-4121 |
| VARIABLE YYY | NONE | 7 |
| ... | | ... |

FIG.12

| ENTITY 1 /7011 | ENTITY 2 /7031 | SIMILARITY DEGREE /7051 |
|---|---|---|
| TABLE-1 | TABLE-2 | 2 /-7101 |
| TABLE-1 | TABLE-3 | 1 /-7111 |
| ... | | |

FIG.19

| EVENT 1 /8011 | EVENT 2 /8031 | SIMILARITY DEGREE /8051 |
|---|---|---|
| GAMEN-1 | GAMEN-2 | 1 /-8101 |
| GAMEN-1 | GAMEN-3 | 0 |
| ... | | |
| GAMEN-3 | GAMEN-31 | 4 /-8131 |
| ... | | |
| GAMEN-1 | FILE-2 | 1 |
| ... | | |
| FILE-1 | FILE-2 | 1 |
| ... | | |

FIG.20

| ENTITY NAME | PROGRAM WHICH UPDATES | PROGRAM WHICH REFERENCES | ... | 1st ANALYSIS VALUE | 2nd ANALYSIS VALUE | ... | AFFECTING EVENT | 1st IMPORTANCE DEGREE | 2nd IMPORTANCE DEGREE | OVERALL IMPORTANCE DEGREE | PROBLEM |
|---|---|---|---|---|---|---|---|---|---|---|---|
| TABLE-1 | PRPGRAM-1 PROGRAM-4 | PROGRAM-1 PROGRAM-3 PROGRAM-4 PROGRAM-5 | | 2 | 5 | | FILE-1 FILE-2 FILE-3 GAMEN-1 GAMEN-2 | 1 | 1 | 1 | NONE |
| TABLE-2 | – | PROGRAM-7 ... | | 0 | 4 | | FILE-1 GAMEN-1 GAMEN-3 GAMEN-31 | 0 | 1 | 0.3 | NONE |
| TABLE-3 | PROGRAM-9 PROGRAM-10 | – | | 2 | 1 | | FILE-3 | 1 | 1 | 1 | NONE |
| ... | | | | | | | | | | | |
| TABLE-10 | PROGRAM-13 PROGRAM-15 PROGRAM-16 PROGRAM-19 PROGRAM-21 | PROGRAM-14 ... | | 5 | ... | | ... | 1 | 0 | 0.7 | NO. OF PROGRAMS EXCEEDS |
| TABLE-11 | ... | ... | | ... | 19 | | FILE-4 FILE-6 ... GAMEN-7 GAMEN-12 | 0 | 0 | 0 | NO. OF EVENTS EXCEEDS |
| ... | | | | | | | | | | | |

| EVENT NAME | ENTITY TO BE UPDATED | ENTITY TO BE REFERENCED | ... | 1st ANALYSIS VALUE | ... | 1st IMPORTANCE DEGREE | 2nd IMPORTANCE DEGREE | OVERALL IMPORTANCE DEGREE | PROBLEM |
|---|---|---|---|---|---|---|---|---|---|
| FILE-1 | TABLE-1<br>TABLE-4 | TABLE-1<br>TABLE-2 | | 2 | | 1 | 1 | 1 | NONE |
| FILE-2 | – | TABLE-1 | | 0 | | 0 | 0 | 0 | NONE |
| FILE-3 | TABLE-1<br>TABLE-3 | TABLE-1 | | 2 | | 1 | 1 | 1 | NONE |
| ... | | | | | | | | | |
| FILE-14 | TABLE-6<br>TABLE-8<br>TABLE-9<br>TABLE-12<br>... | TABLE-11<br>TABKE-13 | | 8 | | 1 | 1 | 1 | NO. OF ENTITIES EXCEEDS |
| GAMEN-1 | TABLE-1 | TABLE-2 | | 1 | | 0 | 1 | 0.3 | NONE |
| GAMEN-2 | – | TABLE-1 | | 1 | | 0 | 0 | 0 | NONE |
| GAMEN-3 | – | TABLE-2<br>TABLE-7<br>TABLE-17<br>TABLE-25 | | 0 | | 0 | 0 | 0 | SIMILAR EVENT EXISTS |
| ... | | | | | | | | | |
| GAMEN-31 | TABLE-17<br>TABLE-25 | TABLE-2<br>TABLE-7 | | 2 | | 1 | 0 | 0.7 | SIMILAR EVENT EXISTS |
| ... | | | | | | | | | |

| ITEM NO. | DATABASE NAME | IMPORTANCE | PROBLEM |
|---|---|---|---|
| 1 | TERMINAL DB | | |
| 2 | EXCHANGE DB | | |
| 3 | PAYMENT DB | O | |
| 4 | MEDIATION DB | | × |
| 5 | E-BILLING DB | O | |
| ... | ... | ... | |
| 10 | TRANSFER REPORT DB | | |
| 11 | EXCESS AND SHORTAGE PAYMENT DB | | |
| 12 | CONTRACTED PAYMENT MANAGEMENT DB | O | × |
| 13 | BEARER DB | O | |
| ... | ... | ... | |

| No | TABLE | PROGRAM WHICH USES | | STATE AT DB USING | | DB PROCESSING | |
|---|---|---|---|---|---|---|---|
| | | PROGRAM | CALLED SUBROUTINE | READ FILE | SCREEN | LINE | SECTION |
| 1 | TABLE-1 | PROGRAM-1 | PROGRAM-2 | FILE-1 | | 11 | SELECT |
| | | | | FILE-1 | GAMEN-1 | 22 | UPDATE |
| | | PROGRAM-2 | | | | 132 | SELECT |
| | | | | | | 216 | UPDATE |
| | | | | | | 257 | INSERT |
| | | PROGRAM-3 | PROGRAM-2 | FILE-2 | GAMEN-2 | 266 | SELECT |
| | | PROGRAM-4 | PROGRAM-2 | FILE-3 | | 196 | SELECT |
| | | | | | | 300 | UPDATE |
| | | PROGRAM-5 | PROGRAM-2 | | | 160 | SELECT |
| 2 | TABLE-2 | PROGRAM-6 | | | | 139 | SELECT |
| | | | | | | 228 | UPDATE |
| | | PROGRAM-7 | PROGRAM-6 | FILE-1 | GAMEN-3 | 307 | SELECT |
| | | ... | | | | ... | ... |
| 3 | TABLE-3 | PROGRAM-8 | | | | 132 | SELECT |
| | | | | | | 217 | UPDATE |
| | | | | | | 258 | INSERT |
| | | PROGRAM-9 | PROGRAM-8 | FILE-3 | | 321 | UPDATE |
| | | PROGRAM-10 | PROGRAM-8 | | | 151 | UPDATE |
| ... | ... | ... | ... | | | ... | ... |

2411 / 2421 / 2431

2401

ENTITIES WHOSE IMPORTANCE DEGREE IS "1" : TABLE-1, TABLE-3
EVENTS WHOSE IMPORTANCE DEGREE IS "1" : FILE-1, FILE-3, GAMEN-1
IMPORTANCE DEGREES ARE IDENTIFIED.

FIG.24

| ITEM NO. | EVENT | ENTITY | | | | | | ANALYSIS VALUE(2) |
|---|---|---|---|---|---|---|---|---|
| | | TABLE-2 | TABLE-7 | TABLE-9 | TABLE-11 | TABLE-17 | TABLE-25 | |
| 1 | FILE-4 | | | | O | | | ... |
| 2 | FILE-6 | | | | O | | | 1 |
| 3 | FILE-8 | | | | O | | | ... |
| 4 | FILE-10 | | | | O | | | ... |
| 5 | FILE-13 | | | O | O | | | ... |
| 6 | FILE-15 | | | O | O | | | ... |
| 7 | FILE-32 | | | O | O | | | ... |
| 8 | FILE-35 | | O | | O | O | O | 4 |
| 9 | FILE-40 | | | | O | | | 1 |
| 10 | FILE-41 | | | | O | | | ... |
| 11 | FILE-42 | | | O | O | O | O | ... |
| 12 | FILE-43 | | | | | | | ... |
| 13 | FILE-44 | | | | O | | | ... |
| 14 | FILE-45 | | | | O | | | ... |
| 15 | FILE-46 | | | | O | | | ... |
| 24 | FILE-80 | | | | O | | | ... |
| 25 | FILE-81 | | | | O | | | ... |
| 26 | FILE-86 | O | | | | | | ... |
| 27 | FILE-87 | | | | O | | | ... |
| 28 | GAMEN-1 | | | | | | | ... |
| 29 | GAMEN-31 | O | O | | | O | O | 4 |
| 30 | GAMEN-7 | | O | | O | | | 2 |
| 31 | GAMEN-12 | | | | O | | | ... |
| 34 | GAMEN-25 | | | | | | | 0 |
| 36 | GAMEN-31 | O | O | | | O | O | 4 |
| | ANALYSIS VALUE(3) | ... | 4 | 4 | 19 | 4 | ... | |

TABLE-11: NO. OF EVENTS AFFECTING THIS ENTITY EXCEEDS 10.
GAMEN-3 AND GAMEN-31: COMBINATION OF ENTITIES AFFECTED BY THEM IS SIMILAR.
PROBLEMS ARE IDENTIFIED.

FIG.25

PROGRAM ANALYSIS METHOD AND APPARATUS

TECHNICAL FIELD OF THE INVENTION

The present invention relates to a program analysis technique, and more particularly to a technique for analyzing a relation between an entity (for example, a database table or the like), which is an information unit to be an object of a processing in a program, and an event (for example, an input screen to be inputted or outputted, a file, a key operation or the like) affecting a processing for the entity.

BACKGROUND OF THE INVENTION

For efficient maintenance or reconstruction of an information system such as a business system, it is necessary to understand a data processing structure in the information system. When the information system is large in size or modification is frequently made due to alteration of work, however, the processing structure is complicated and it is hard to grasp the entire information system. Moreover, there are many cases where an original developer or system administrator is absent due to long-term maintenance or operation or where a document is not synchronized with the system content due to insufficient document maintenance, which leads to further difficulty in grasping the information system. Accordingly, there have been used techniques for extracting a dependency relation between an entity and an event, the influenced area, a control flow, or a data flow by analyzing a source program or the like.

For example, U.S. Pat. No. 6,922,825 discloses a technique for checking on a data item access state in a program and a technique for analyzing a coupling relation between processes and data items included in the program based on the data item access state. Furthermore, it discloses a technique for presenting a data item allocation mode or a process division mode by using the data item access state data and the collected process information.

In addition, for example, U.S. Pat. No. 6,009,267 discloses a technique for extracting a data item name, a use application or the like defined in a source program, a technique for extracting a statement to carry out an input check processing or a setting processing at the output time, for a data item group having an external interface for other programs or external peripheral devices in the source program as a statement related to business specifications and for extracting a statement to carry out a file access related processing as a statement related to a computer control, and a technique for classifying the extracted statements into "business specification" and "control" groups and then outputting them into files, for example, with their line numbers and records including the data items used in the syntax or for listing the extracted statements in association with the record names and business terms. These inventions, however, do not suggest a viewpoint of determining whether or not specific entities or events are important or determining whether or not they have a problem, on the basis of the analysis result.

For example, US 2005/0108649 A1 discloses a control apparatus including means for receiving command data described in Extensible Markup Language (XML), means for analyzing the command data, and control means for carrying out a processing previously associated with a control code defined in a tag of an element in advance, when the analysis means detects the element in which the control code is defined in the tag from the command data. According to this invention, it is possible to provide the control apparatus having an improved throughput while exchanging data described in a standard language. Furthermore, U.S. Pat. No. 6,631,379 discloses a technique for determining a database command generated for each type of loaded XML document, and analyzing the XML document by utilizing multithread and separated processes to update a database. According to this invention, a lot of XML data files can be processed and loaded simultaneously and a required system memory is minimized to maximize the system reliability and memory management, which reduces a required time period from the start of processing the XML file to the end of loading it into the database. In these inventions, however, the analysis result of the source code is used for executing the control code, but not for presenting a relation between an entity and an event for a user.

For example, JPA-2003-157262 discloses a patent analyzer including a patent search database that previously stores a word or compound word contained in target patent documents as words or phrases for search in association with the patent documents; a word or phrase extraction unit that analyzes source patent documents to extract the words or compound words contained in the patent documents for condition settings as search condition words or phrases; and a search unit that compares the word or phrase for search with the search condition word or phrase to search for a patent document showing a high similarity to the source patent document as a highly relevant patent document to the source patent document. According to the aforementioned configuration, it is possible to search for the patent document showing the high similarity to the source patent document as a highly relevant patent document to the source patent document. However, there has not been a program analysis technique for determining a similarity or relevance between programs.

As described above, the conventional techniques only show the relation between an entity and an event, and there has not been a technique for determining whether or not the entity or the event is important or whether or not there is a problem in the entity or the event on the basis of the analysis result.

SUMMARY OF THE INVENTION

Therefore, an object of the present invention is to provide a technique for providing concrete information necessary for maintenance or the like for programs in an information system.

Another object of the present invention is to provide a novel technique for providing a relation between an entity and an event in the program in the information system more specifically.

Still another object of the present invention is to provide a technique for identifying the importance degree of an entity or an event by analyzing the relation between the entity and the event of the program.

Yet another object of the present invention is to provide a technique for determining whether or not there is a problem in an entity or an event by using the analysis result of the relation between the entity and the event in the program.

A program analysis method (i.e. a method of calculating an influence degree of an entity) according to a first aspect of the present invention includes: storing an entity (e.g. a table in a database or the like) that is an information unit as an object of a processing in a program into a relation table in association with an event (e.g. an input screen to be inputted or outputted, a file, a key operation or the like) affecting a processing for the entity; calculating importance degrees (e.g. a first importance degree of the event in an embodiment of the present invention) of the events by using data stored in the relation table, and storing the calculation results into a storage device; and identifying an event affecting a processing for a specific entity by using the data stored in the relation table, and calculating an influence degree (e.g. a second importance degree of the entity in the embodiment of the present invention) of the specific entity by using the importance degree of the identified event, which is stored in the storage device, and storing the calculation result into the storage device.

In the information system, plural programs, entities, and events are closely related to and effecting each other. Therefore, for example, when updating a specific entity in the information system, it is necessary to consider what effect will be given to the event and what effect will be given to other portions within the information system such as, for example, other entities as a result of the effect on the event. According to the program analysis method of the first aspect of the present invention, the more important an event affecting a processing for the specific entity (for example, the larger the effect of the event on other entities), the larger the influence degree of the specific entity is. Therefore, because the user can grasp the influence degree of the entity, it becomes easy to grasp how much the update of the entity affects other portion in the information system.

Furthermore, in the aforementioned storing, identification information of a program that carries out a processing for an entity and a type of the processing may be stored into the relation table in association with the entity. In this case, the program analysis method according to the first aspect of the present invention may further include: counting the number of programs that carry out a processing of a predetermined type for the specific entity, and storing the counted number of programs into the storage device; calculating a utilization degree (e.g. a first importance degree of the entity in the embodiment of the present invention) of the specific entity by using the counted number of programs, which is stored in the storage device, and storing the calculation result into the storage device; and calculating an overall importance degree of the specific entity by using the utilization degree of the specific entity and the influence degree of said specific entity, which are stored in the storage device, and storing the calculation result into the storage device. The range affected by the entity within the information system can be identified by counting the number of programs that carries out the processing for the entity. Furthermore, it is possible to determine how important the entity is by totaling the influence degree of the entity, which indicates the magnitude of the influence, and the utilization degree of the entity, which represents the influenced range.

A program analysis method (a method of calculating the influence degree of an event) according to a second aspect of the present invention includes: storing an entity that is an information unit as an object of a processing in a program into a relation table in association with an event affecting a processing for the entity; calculating importance degrees (e.g. the first importance degree of the entity in the embodiment of the present invention) of entities by using data stored in the relation table, and storing the calculation result into a storage device; and identifying an entity as an object of a processing affected by a specific event by using the data stored in the relation table, and calculating an influence degree (e.g. the second importance degree of the event in the embodiment of the present invention) of the specific event by using the importance degree of the identified entity, which is stored in the storage device, and storing the calculation result into the storage device.

The method of calculating the influence degree of the event according to the second aspect of the present invention is based on the same idea as the method of calculating the influence degree of the entity according to the first aspect of the invention. Similarly to the first aspect of the invention, it is necessary to consider what effect will be given to the entity by the event, namely a file or data on an input screen or the like and what effect will be given by the entity to other portions such as other events within the information system. Because the user know the influence degree of the event, which is calculated according to the second aspect of the present invention, he or she can grasp more easily what effect will be given by the event to other portions within the information system.

The program analysis method according to the second aspect of the present invention may further include: counting the number of entities as objects of processings affected by the specific event by using the data stored in the relation table, and storing the counted number of entities into the storage device; calculating an utilization degree (e.g. the first importance degree of the event in the embodiment of the present invention) of the specific event by using the counted number of entities, which is stored in the storage device, and storing the calculation result into the storage device; and calculating an overall importance degree of the specific event by using the utilization degree of the specific event and the influence degree of the specific event, which are stored in the storage device, and storing the calculation result into the storage device. Similarly to the first aspect of the present invention, the utilization degree of the event indicates the range affected by the event, within the information system. Therefore, it is possible to determine how important the event is by totaling the utilization degree of the event and the influence degree of the event, which indicates the magnitude of the influence.

A program analysis method (a method of judging whether or not the entity has a problem) according to a third aspect of the present invention includes: storing an entity that is an information unit as an object of a processing in a program into a relation table in association with an event affecting a processing for the entity; counting a number of events affecting both of a processing for a first entity and a processing for a second entity, and storing the counted number of events into a storage device; calculating an inter-entity similarity degree between the first entity and the second entity by using the counted number of events, which is stored in the storage device, and storing the calculation result into the storage device; and upon detecting that the inter-entity similarity degree, which is stored in the storage device, is greater than a predetermined value, storing data indicating the first entity and the second entity have a problem, into the storage device.

There can be a case where plural of entities similar to one another (for example, tables including a lot of common data items) are created as a result of frequently modifying the information system. The existence of mutually similar entities causes the plural entities to retain data having the same content, which leads to a waste of a capacity of the storage device. Furthermore, omission of updating data easily occurs due to a programming glitch or the like. These entities have a problem and therefore it is preferable to take measures such as integrating the entities. According to the program analysis method of the third aspect of the present invention, the inter-entity similarity between one entity and the other entity is calculated based on the number of events affecting both of the entities to judge whether or not the entities have a problem according to the inter-entity similarity. The reason why the number of events affecting both of the two entities is used is because it is considered that there are a lot of events affecting both of the two entities, for example, if the entities resemble each other. Thereby, the user can easily grasp entities having a problem.

The program analysis method according to the third aspect of the present invention may further include: counting, for each entity, a number of events affecting a processing for the entity by using the data stored in the relation table, and storing the counting results into the storage device; and identifying an entity whose number of events, which is stored in the storage device, is greater than a predetermined value, and storing data indicating the identified entity has a problem, into the storage device. When there are too many events affected by the entity, some problem easily occurs during a maintenance work of the information system. Therefore, it is preferable to take measures such as dividing the entity or normalization. With the presentation of the data indicating that the entity has a problem, the user can easily grasp the entity requiring countermeasures.

A program analysis method (a method of judging whether or not the event has a problem) according to a fourth aspect of the present invention includes: storing an entity that is an information unit as an object of a processing in a program into a relation table in association with an event affecting a processing for the entity; counting the number of entities to be an object of a processing affected by a first event and an object of a processing affected by a second event by using data stored in the relation table, and storing the counted number of entities into a storage device; calculating an inter-event similarity degree between the first event and the second event by using the counted number of entities, which is stored in the storage device, and storing the calculation result into the storage device; and upon detecting that the inter-event similarity degree is greater than a predetermined value, storing data indicating that the first event and the second event have a problem, into the storage device.

There can be a case where plural events similar to one another (for example, files including a lot of common data items, input screens used for similar purposes, or the like) are created as a result of frequently modifying the information system. The existence of mutually similar events complicates the system, which leads to increasing the possibility of a problem occurring during a maintenance work. Therefore, it is preferable to take measures such as integrating the events resembling each other. According to the program analysis method of the fourth aspect of the present invention, the inter-event similarity between one event and the other event is calculated based on the number of entities to be a target of a processing affected by one event and a target of a processing affected by the other event to judge whether or not the events have a problem according to the similarity. The reason why the number of entities affected by the two events is used is because it is considered that mutually similar events often affect the same entities. Thereby, the user can easily grasp events having a problem.

The program analysis method according to the fourth aspect of the present invention may further include: counting, for each event, the number of entities as objects of processings affected by the event, by using the data stored in the relation table, and storing the counted number of entities into the storage device; and identifying an event whose number of entities, which is stored in the storage device, is greater than a predetermined value, and storing data indicating the identified event has a problem, into the storage device. When there are too many entities affected by the event, some problem easily occurs during a maintenance work of the information system. Therefore, it is preferable to take measures such as dividing the event or integrating the entities. With the presentation of the data indicating that the event has a problem, the user can easily grasp the event requiring countermeasures.

Incidentally, it is possible to create a program for causing a computer to execute the program analysis method according to one of the aforementioned first to fourth aspects of this invention. The program is stored into a storage medium or a storage device such as, for example, a flexible disk, a CD-ROM, a magneto-optical disk, a semiconductor memory, or a hard disk. In addition, the program may be distributed as digital signals over a network in some cases. Data under processing is temporarily stored in the storage device such as a computer memory.

BRIEF DESCRIPTION OF THE DRAWINGS

FIG. 5 is a diagram showing an example of a syntax tree data stored in a syntax tree table;

FIG. 10 is a diagram showing an example of data stored in a relation table;

FIG. 12 is a diagram showing an example of data stored in a variable storage;

FIG. 14 is a diagram showing an example of data stored in an entity analysis value table;

FIG. 15 is a diagram showing an example of data stored in an event analysis value table;

FIG. 19 is a diagram showing an example of data stored in an entity similarity degree table;

FIG. 20 is a diagram showing an example of data stored in an event similarity degree table;

FIG. 24 is a diagram showing an example of an output screen to display processing results in the embodiment of the present invention;

FIG. 25 is a diagram showing an example of an output screen to display processing results in the embodiment of the present invention.

DETAILED DESCRIPTION OF THE PREFERRED EMBODIMENTS

Figure 1:
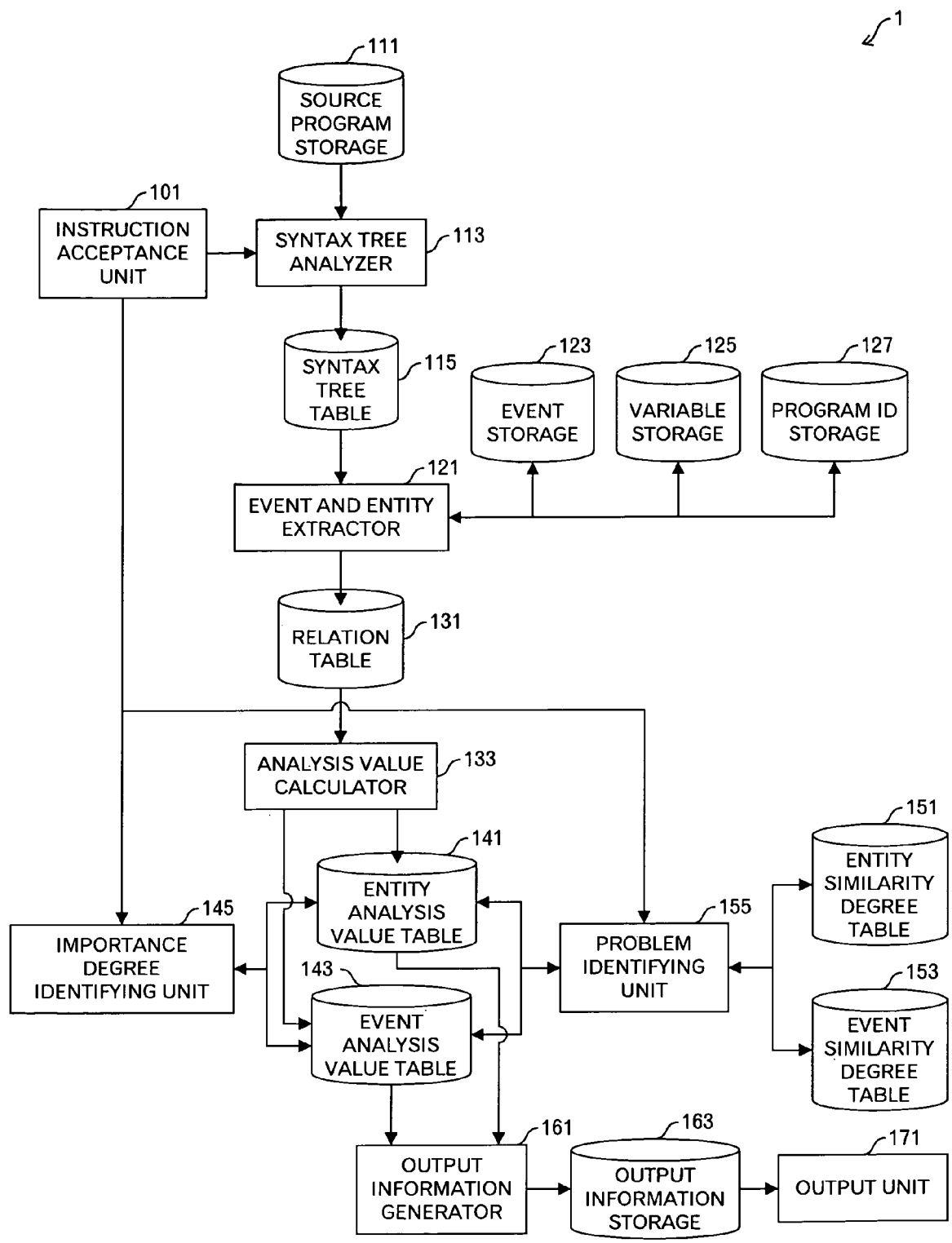
FIG. 1 is a system outline diagram of an analysis apparatus according to an embodiment of the present invention.

FIG. 1 shows a system outline of an analysis apparatus according to an embodiment of the present invention. Incidentally, a stand-alone configuration will be described in which all functions are implemented in the analysis apparatus 1. However, for example, a client-server configuration including a user terminal and the analysis apparatus 1 may be adopted. Moreover, an example in which the analysis apparatus 1 is composed of a single computer will be described. However, it may be composed of plural computers in some cases.

As shown in FIG. 1, the analysis apparatus 1 includes: an instruction acceptance unit 101, a source program storage 111, a syntax tree analyzer 113, a syntax tree table 115, an event and entity extractor 121, an event storage 123, a variable storage 125, a program ID storage 127, a relation table 131, an analysis value calculator 133, an entity analysis value table 141, an event analysis value table 143, an importance degree identifying unit 145, an entity similarity degree table 151, an event similarity degree table 153, a problem identifying unit 155, an output information generator 161, an output information storage 163, and an output unit 171.

The instruction acceptance unit 101 accepts an instruction from a user and outputs a command to the syntax tree analyzer 113, the importance degree identifying unit 145, and the problem identifying unit 155. Upon receiving data from the instruction acceptance unit 101, the syntax tree analyzer 113 carries out a processing with reference to the source program storage 111, and stores a processing result into the syntax tree table 115. An event and entity extractor 121 processes the syntax tree table 115 while storing intermediate processing results into the event storage 123, the variable storage 125, and the program ID storage 127, and then stores a final processing result into the relation table 131. The analysis value calculator 133 carries out a processing with reference to the relation table 131, and stores processing results into the entity analysis value table 141 and the event analysis value table 143. The importance degree identifying unit 145 carries out a processing with reference to the entity analysis value table 141 and the event analysis value table 143, and stores processing results into the entity analysis value table 141 and the event analysis value table 143. The problem identifying unit 155 processes the entity analysis value table 141 and the event analysis value table 143 while storing intermediate processing results into the entity similarity degree table 151 and the event similarity degree table 153, and then stores final processing results into the entity analysis value table 141 and the event analysis value table 143. The output information generator 161 carries out a processing with reference to the entity analysis value table 141 and the event analysis value table 143, and stores a processing result into the output information storage 163. The output unit 171 outputs the data stored in the output information storage 163 to a user.

Next, a processing in this embodiment will be described with reference to FIG. 2 to FIG. 25. This section describes an example of a processing for analyzing plural source programs, calculating the importance degree of an entity to be an object (i.e. a target) of a processing in the source programs and the importance degree of an event affecting the entity, and further identifying an entity and an event having a problem. Incidentally, while the following shows an example of analyzing source programs created, for example, in COBOL as shown in FIG. 3, source programs created in any other program language may be analyzed.

After accepting an execution instruction of the analysis processing from a user, the instruction acceptance unit 101 outputs a processing instruction to the syntax tree analyzer 113 (step S1). The execution instruction is inputted by the user through, for example, an input device of the analysis apparatus 1 or transmitted via a network such as, for example, a local area network (LAN) from a user's terminal. The execution instruction includes the designation of one or more source programs to be analyzed and/or a type of information required to be grasped (for example, whether or not an entity having a problem is identified, whether or not the importance degree of the event is calculated, or the like).

The syntax tree analyzer 113 reads out the designated source programs from the source program storage 111 (step S3). Thereafter, it analyzes the read source programs to generate data of the syntax tree, and stores the data of the syntax tree into the syntax tree table 115 (step S5).

Figures 3, 7, 8:
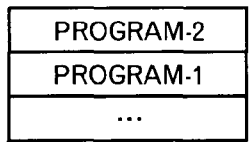
FIG. 3 is a diagram showing an example of a source program stored in a source program storage.
FIG. 7 is a diagram showing an example of data stored in a program ID storage.
FIG. 8 is a diagram showing an example of data stored in an event storage.
Figure 4:
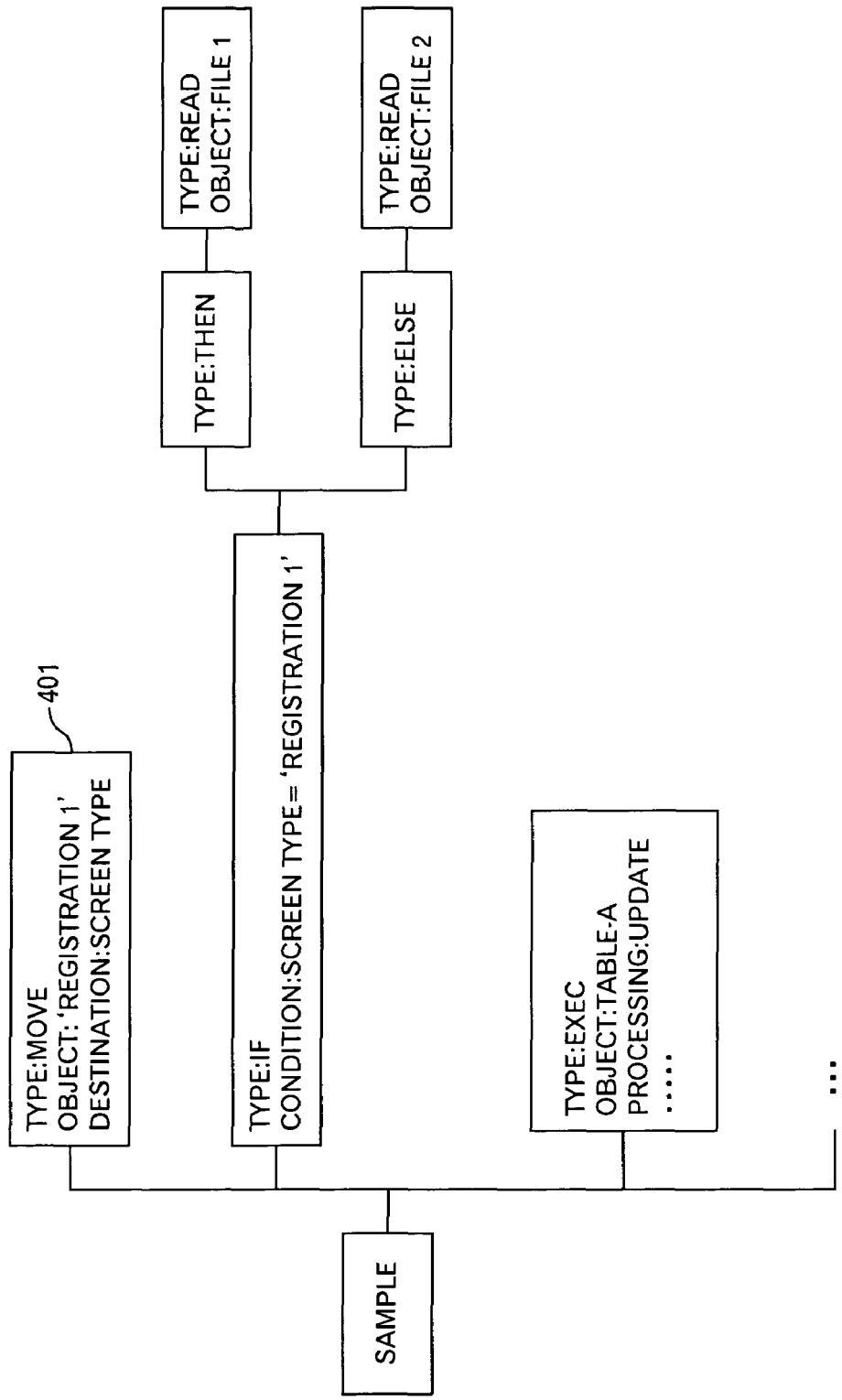
FIG. 4 is a diagram showing an example of a syntax tree generated based on the source program show in FIG. 3.

FIG. 4 shows an example of the syntax tree generated based on the source program shown in FIG. 3. In this embodiment, one node of the syntax tree corresponds to one statement of the source program as a general rule. For example, a MOVE statement 301 of a line number 010100 in the source program shown in FIG. 3 corresponds to a node 401 of the syntax tree shown in FIG. 4. The syntax tree shown in FIG. 4 is stored as data as shown in FIG. 5 in the syntax tree table 115.

FIG. 5 shows an example of the data of the syntax tree stored in the syntax tree table 115 as a result of analyzing the source program having the program ID "SAMPLE" and shown in FIG. 3. The syntax tree table 115 includes a column 1011 of a node number, a column 1013 of a parent node number, a column 1015 of a program ID, a column 1017 of a line number, a column 1031 of a type, a column 1051 of an attribute 1, a column 1053 of a value 1, a column 1071 of an attribute 2, and a column 1073 of a value 2. One line of the syntax tree table represents one node of the syntax tree. For example, a line 1111 corresponds to the MOVE statement 301 of the line number 010100 in the source program in FIG. 3, and corresponds to the node 401 of the syntax tree in FIG. 4. The column 1011 of the node number stores a number uniquely set for each node of the syntax tree. In the example shown in FIG. 5, the node having the program ID "SAMPLE" is a root node as shown in a line 1101 and other nodes link to the parent node registered in the column 1013 of the parent node number. In this embodiment, the program ID is, as shown in FIG. 5, registered in the column 1051 of the attribute 1 in the line 1101 of the root node. In the syntax tree table 115, plural combinations of the attribute and value may be registered as shown in a line 1151, while no combination of the attribute and value may be registered as shown in a line 1131. The data of the syntax tree can be generated by a known program analysis technique and therefore the detailed description is omitted here. Moreover, the data of the syntax tree is not limited to the example shown in FIG. 5.

Subsequently, the event and entity extractor 121 carries out a relation extraction processing with reference to the syntax tree table 115 (step S7). The details of the relation extraction processing will be described with reference to FIG. 6 to FIG. 12. The relation extraction processing is executed for each program. In this embodiment, a variable "screen type" is a variable concerning an event of an input screen. For example, when a value is substituted for the "screen type" variable, it is assumed that the event designated by the value occurs.

Figure 6:
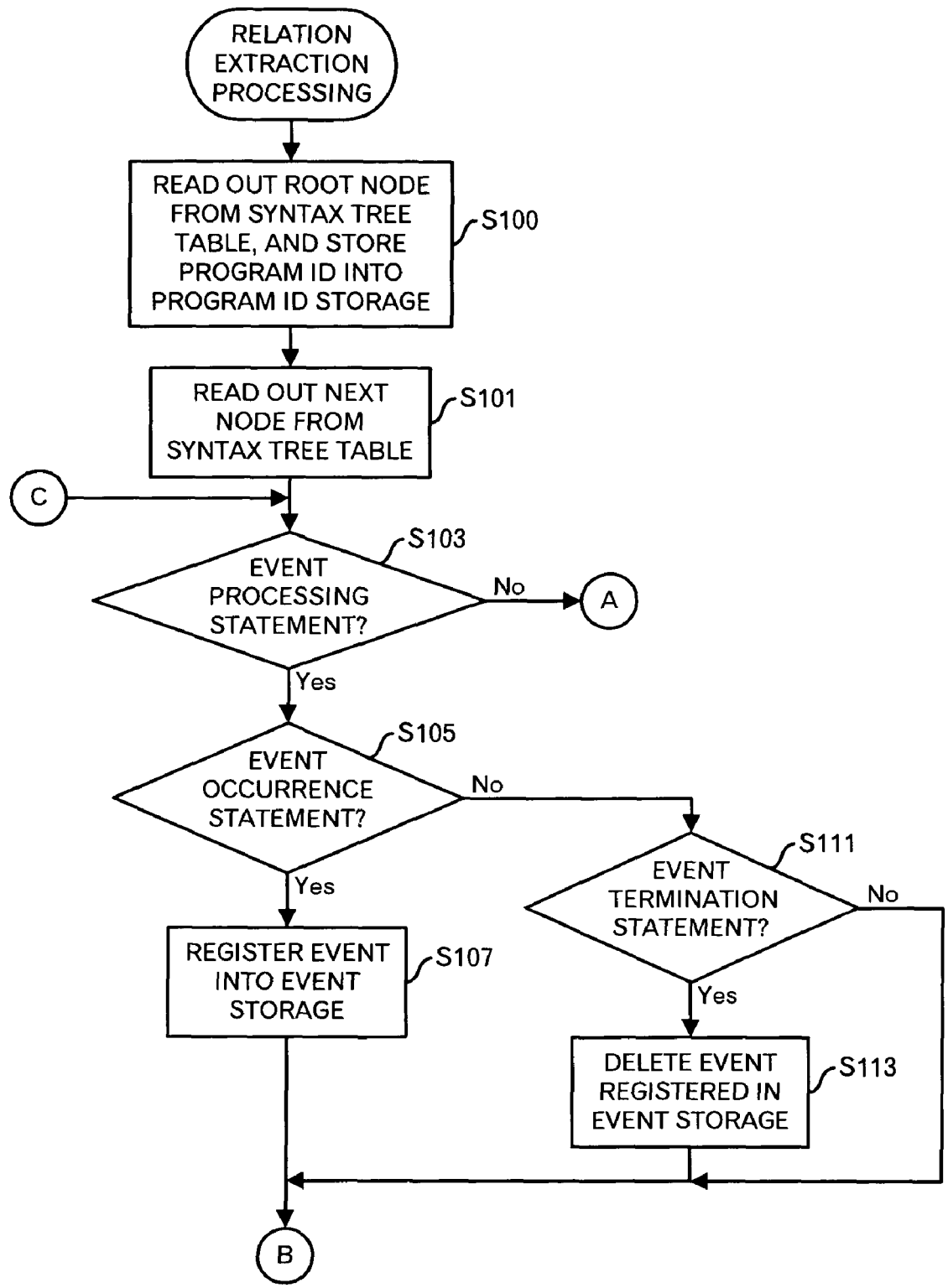
FIG. 6 is a diagram showing a processing flow of a relation extraction processing.

First, the event and entity extractor 121 reads out data of the root node from the syntax tree table 115, and stores the program ID into the program ID storage 127 (FIG. 6: step S100). FIG. 7 shows an example of data stored in the program ID storage 127. In the program ID storage 127, program IDs are temporarily stacked as shown in FIG. 7. When a subroutine is called in the program, the program ID of the subroutine is further added to the stack. A processing in a case of calling the subroutine will be described later.

Subsequently, the event and entity extractor 121 reads out data of the node to be executed next from the syntax tree table 115 (step S101). Although the node to be executed next is a node normally corresponding to the next line in the syntax tree table 115, it may be sometimes a node designated in a program control statement, for example. Then, the event and entity extractor 121 judges whether or not the data of the read node corresponds to an event processing statement (for example, a statement for a processing relating to an input screen, a file, or a key operation) (step S103). If it is judged that the data corresponds to the event processing statement (step S103: YES route), the event and entity extractor 121 further judges whether or not the data of the read node corresponds to an event occurrence statement (for example, a statement to display an input screen, open a file or the like) (step S105). On the other hand, unless it is judged that the data corresponds to the event processing statement (step S103: NO route), the processing progresses to a processing flow in FIG. 9 via a terminal A.

If it is judged that the data of the read node corresponds to the event occurrence statement (step S105: YES route), the event and entity extractor 121 registers the event that occurs in the node in the event storage 123 (step S107). FIG. 8 shows an example of data stored in the event storage 123. The event storage 123 stores a table that temporarily stores data relating to events as shown in FIG. 8, and the table includes a column 2011 of an event type and a column 2031 of an event name. Event types such as a screen, a file, and a key operation are registered in the column 2011 of the event type. Events regarded as objects in the event occurrence statement are registered in the column 2031 of the event name. When the different types of events occur according to a predetermined condition (for example, a variable value or the like), only an event satisfying the predetermined condition is registered, for example, based on the variable stored in the variable storage 125. The event data registered in the event storage 123 is deleted when an event termination statement of the pertinent event is detected or when the end of the program is detected.

In the example of the syntax tree data shown in FIG. 5, the variable "screen type" is set in the line 1111. Therefore, the line 1111 indicates a statement concerning the display of the input screen and is determined to correspond to the event occurrence statement. In this case, data as indicated by a line 2101 in FIG. 8 is registered in the event storage 123 on the basis of the line 1111 in FIG. 5. Also as for a line 1133 in FIG. 5, because a file "file 1" is read out, the line 1133 is determined to correspond to the event occurrence statement and data as shown in a line 2111 of FIG. 8 is registered in the event storage 123.

On the other hand, unless it is judged that the data of the read node corresponds to the event occurrence statement (step S105: NO route), the event and entity extractor 121 judges whether or the data of the read node corresponds to the event termination statement (for example, a statement to switch the input screen, close a file, or the like) (step S111). Unless it is judged that the data of the read node corresponds to the event termination statement (step S111: NO route), the processing progresses to a processing flow shown in FIG. 11 via a terminal B. On the other hand, if it is judged that the data of the read node corresponds to the event termination statement (step S111: YES route), the event and entity extractor 121 deletes the data on the event designated in the event termination statement from the event storage 123 (step S113). Thereafter, the processing progresses to the processing flow in FIG. 11 via the terminal B.

Figure 9:
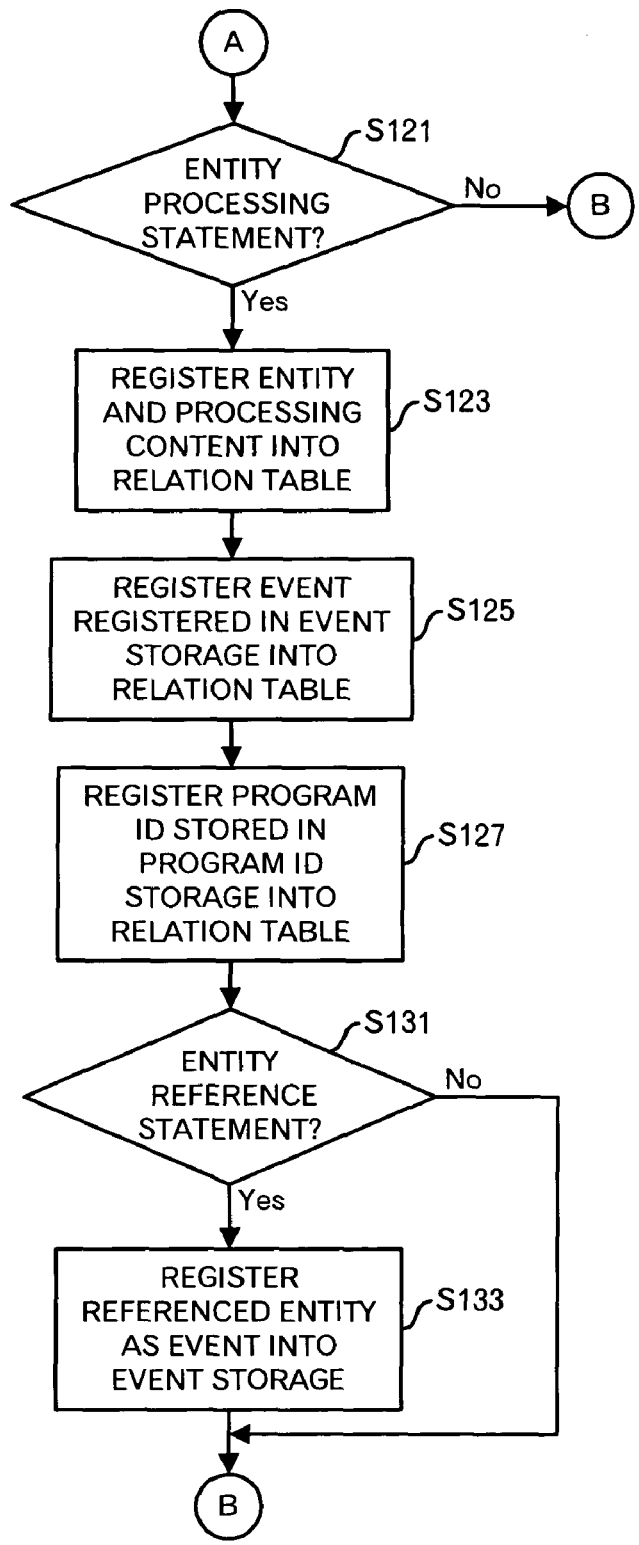
FIG. 9 is a diagram showing a processing flow of the relation extraction processing.

Unless it is judged that the data of the read node correspond to an event processing statement (step S103: No route), the event and entity extractor 121 judges whether or not the data of the read node corresponds to an entity processing statement (for example, a statement to execute a structured query language (SQL) to access the database)(FIG. 9: step S121). Unless it is judged that the data of the read node corresponds to the entity processing statement (step S121: NO route), the processing progresses to the processing flow in FIG. 11 via the terminal B.

On the other hand, if it is judged that the data of the read node corresponds to the entity processing statement (step S121: YES route), the event and entity extractor 121 registers the entity processed in the entity processing statement and the type of the processing for the entity into the relation table 131 (step S123).

For example, when the event and entity extractor 121 reads out data of the line 1151 from the syntax tree table 115, the line 1151 is determined to correspond to the entity processing statement, because it indicates a statement for executing an SQL. Because the statement shown in the line 1151 is for use in an "UPDATE" processing for an entity "TABLE-A," the entity "TABLE-A" and the processing type "UPDATE" are registered into the relation table 131.

Subsequently, the event and entity extractor 121 stores the event stored in the event storage 123 in association with the registered entity into the relation table 131 (step S125). Because a screen event "REGISTRATION 1" is registered in the event storage 123 in this embodiment, the event "REGISTRATION 1" is stored in association with the entity "TABLE-A" into the relation table 131.

Next, the event and entity extractor 121 stores the program ID stored in the program ID storage 127 in association with the registered entity into the relation table 131 (step S127). When plural program IDs are stored in the program ID storage 127, the program ID first stored in the stack (stored at the bottom of the stack) is registered as a main routine and other program IDs are registered as subroutines.

FIG. 10 shows an example of data stored in the relation table 131. The relation table 131 includes a program section 3011, an event section 3031, and an entity section 3051. The program section 3011 includes a column 3013 of a program and a column 3015 of a called subroutine. The event section 3031 includes a column 3033 of a read file, a column 3035 of a screen, and a column 3037 of a key operation. The entity section 3051 includes a column 3035 of a target table, a column 3055 of a line number, and a column 3057 of a processing. In the example of this embodiment, the "UPDATE" processing is carried out for the "TABLE-A" in the program "SAMPLE" as shown in a line 3111 in FIG. 10 and it is registered that an event "REGISTRATION 1" affects the processing. When plural events are registered in the event storage 123, it is considered that all events affects the entity. Therefore, for example, as shown in a line 3131 of FIG. 10, all registered events are registered in the relation table 131. The column 3055 of the line number stores line numbers of statements to carry out processings for the entities in the source program.

Incidentally, the example shown in the line 3111, no subroutine program ID is registered in the program ID storage 127 and therefore data is not registered in the column 3015 of the called subroutine. In addition, while the entities are managed in units of a table in the entity section 3051 of the relation table 131, the entities may be managed in units of a column (ITEM) included in the table.

Next, the event and entity extractor 121 judges whether or not the data of the node read from the syntax tree table 115 corresponds to an entity reference statement (step S131). The entity reference statement is a statement whose processing type for the entity corresponds to "REFERENCE" such as a "SELECT" statement in an SQL statement. If the data of the read node corresponds to the entity reference statement (step S131: YES route), the event and entity extractor 121 registers the entity referenced in the entity reference statement as an event into the event storage 123 (step S133). The reason why it is treated as an event in spite of the processing for the entity is because there is possibility that the data referenced in the entity reference statement affects the subsequent processing for the entity. Thereafter, the processing progresses to the processing flow in FIG. 11 via the terminal B. On the other hand, unless it is judged that the data of the read node corresponds to the entity reference statement (step S131: NO route), the processing progresses to the processing flow in FIG. 11 via the terminal B.

Figure 11:
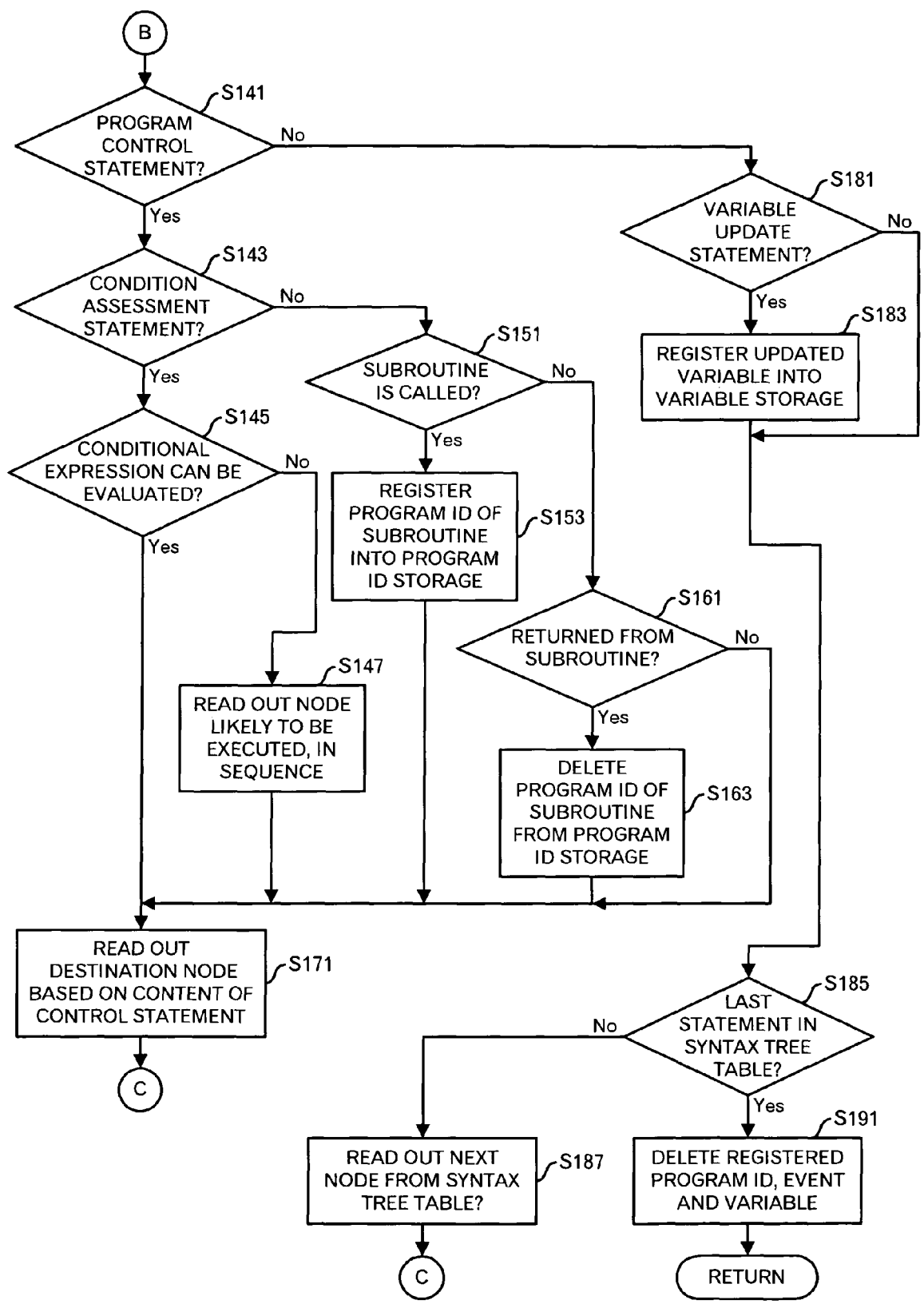
FIG. 11 is a diagram showing a processing flow of the relation extraction processing.

After judging whether or not the data of the node read from the syntax tree table 115 corresponds to the event processing statement or whether or not it corresponds to the entity processing statement, in the steps S101 to S133, the event and entity extractor 121 judges whether or the data of the read node corresponds to a program control statement (FIG. 11: step S141). Unless it is judged that the data of the read node corresponds to the program control statement (step S141: NO route), the processing progresses to step S181. On the other hand, if it is judged that the data of the read node corresponds to the program control statement (step S141: YES route), the event and entity extractor 121 further judges whether or not the data of the read node corresponds to a condition assessment statement (step S143). Unless it is judged that the data of the read node corresponds to the condition assessment statement (step S143: NO route), the processing progresses to step S151.

On the other hand, if it is judged that the data of the read node corresponds to the condition assessment statement (for example, IF statement) (step S143: YES route), the event and entity extractor 121 judges whether or not the conditional expression can be evaluated (step S145). In this embodiment, "the conditional expression can be evaluated" means that the conditional expression can be judged to be true or false, for example, when the processing branches according to whether the conditional expression is true or false and a processing executed thereby can be identified. For example, supposing that there is a conditional expression using a value of a variable A, the value of the variable A is uniquely determined only when the value of the variable A has already been defined or substituted. Therefore, the conditional expression can be evaluated. On the other hand, unless the value of the variable A is uniquely determined, for example, when the value of the variable A is identified based on another conditional expression that cannot be evaluated, the conditional expression cannot be evaluated. For example, in the syntax tree table 115 shown in FIG. 5, the condition assessment statement in a line 1121 includes a "SCREEN TYPE" variable as a branch condition and the "SCREEN TYPE" variable has already been defined in the line 1111. Therefore, the conditional expression can be evaluated. When the conditional expression in the condition assessment statement can be evaluated (step S145: YES route), the processing progresses to step S171. On the other hand, unless the conditional expression can be evaluated (step S145: NO route), a processing to be executed next cannot be identified. Therefore, the event and entity extractor 121 reads out a node likely to be executed in order from the relation table 131 (step S147). Thereafter, the processing progresses to the step S171.

Unless it is judged that the data of the read node corresponds to the condition assessment statement (step S143: NO route), the event and entity extractor 121 judges whether or not the data of the read node corresponds to a statement for calling a subroutine (for example, CALL statement or the like) (step S151). If it is judged that the data of the read node corresponds to the statement for calling a subroutine (step S151: YES route), the event and entity extractor 121 registers the program ID of the subroutine called in the statement into the program ID storage 127 (step S153). This registration is carried out in order to present a user that the processing for the entity is executed by the subroutine called by the program. In this embodiment, PROGRAM-2 as a subroutine program ID is stored above the PROGRAM-1 as a main routine program ID in the stack. Thereafter, the processing progresses to the step S171.

On the other hand, unless it is judged that the data of the read node corresponds to the statement for calling a subroutine (step S151: NO route), the event and entity extractor 121 judges whether or not the data of the read node corresponds to a statement for returning from a subroutine (for example, a RETURN statement or EXIT statement or the like) (step S161). If it is judged that the data of the read node corresponds to the statement for returning from the subroutine (step S161: YES route), the event and entity extractor 121 deletes the subroutine name from the program ID storage 127 (step S163). Thereafter, the processing progresses to the step S171. On the other hand, unless it is judged that the data of the read node corresponds to the statement for returning from the subroutine (step S161: NO route), the processing progresses to the step S171.

Subsequently to the processing for determining the type of the program control statement, the event and entity extractor 121 reads out a node identified according to the content of the control statement from the syntax tree table 115 (step S171). For example, the program control statement in the line 1121 of the syntax tree table 115 shown in FIG. 5 corresponds to a condition assessment statement by which a conditional expression can be evaluated. Therefore, the node of the "THEN" statement in the line 1131 and its subsequent nodes are read out, while the node of the "ELSE" statement in the line 1141 and its subsequent nodes are not read out. Incidentally, when the program control statement corresponds to a repetition statement (for example, a FOR statement, a PERFORM statement, or the like), the event and entity extractor 121 reads out the node only first once in the step S171 independently of the designated number of repetitions. Thereafter, the processing returns to the step S103 in FIG. 6 to repeat the processing for the nodes read out in the step S171.

On the other hand, unless it is judged that the data of the read node corresponds to the program control statement (step S141: NO route), the event and entity extractor 121 further judges whether or not the data of the read node corresponds to a variable update statement (for example, defining a variable, assigning a value to a variable, or the like) (step S181). If it is judged that the data of the read node corresponds to the variable update statement (step S181: YES route), the event and entity extractor 121 stores the variable name of the updated variable and its value into the variable storage 125 (step S183). Thereafter, the processing progresses to step S185. On the other hand, unless it is judged that the data of the read node corresponds to the variable update statement (step S181: NO route), the processing progresses to the step S185.

FIG. 12 shows an example of data stored in the variable storage 125. The variable storage 125 stores a table to temporarily store data on variables as shown in FIG. 12. The table includes a column 4011 of a variable name, a column 4031 of a branch condition, and a column 4051 of a value. For example, in the example of the syntax tree data shown in FIG. 5, the value is set to the variable "SCREEN TYPE" in the line 1111. Therefore, the line 1111 is judged to correspond to the variable update statement. In this case, as shown in a line 4101 in FIG. 12, the variable name and its value identified in the line 1111 are registered in the variable storage 125. The variable name and its value stored in the variable storage 125 are used in order to evaluate a branch condition, for example. Incidentally, if there is possibility that one variable has plural values according to a conditional branch, a value is retained for each branch condition, for example, as shown in a line 4111 and a line 4121.

Next, the event and entity extractor 121 judges whether or not the last node of the syntax tree table 115 has been read out (step S185). If the next node still remains (step S185: NO route), the event and entity extractor 121 reads out the next node data from the syntax tree table 115 (step S187). Thereafter, the processing returns to the step S103 in FIG. 6 via a terminal C to repeat the processing for the next node. On the other hand, if the read node is the last node (step S185: YES route), the event and entity extractor 121 deletes the program IDs stored in the program ID storage 127, information on the events stored in the event storage 123, and information on the variables stored in the variable storage 125 (step S191) and completes the processing. In this way, the relation table 131 used for the following processing is prepared.

Figure 2:
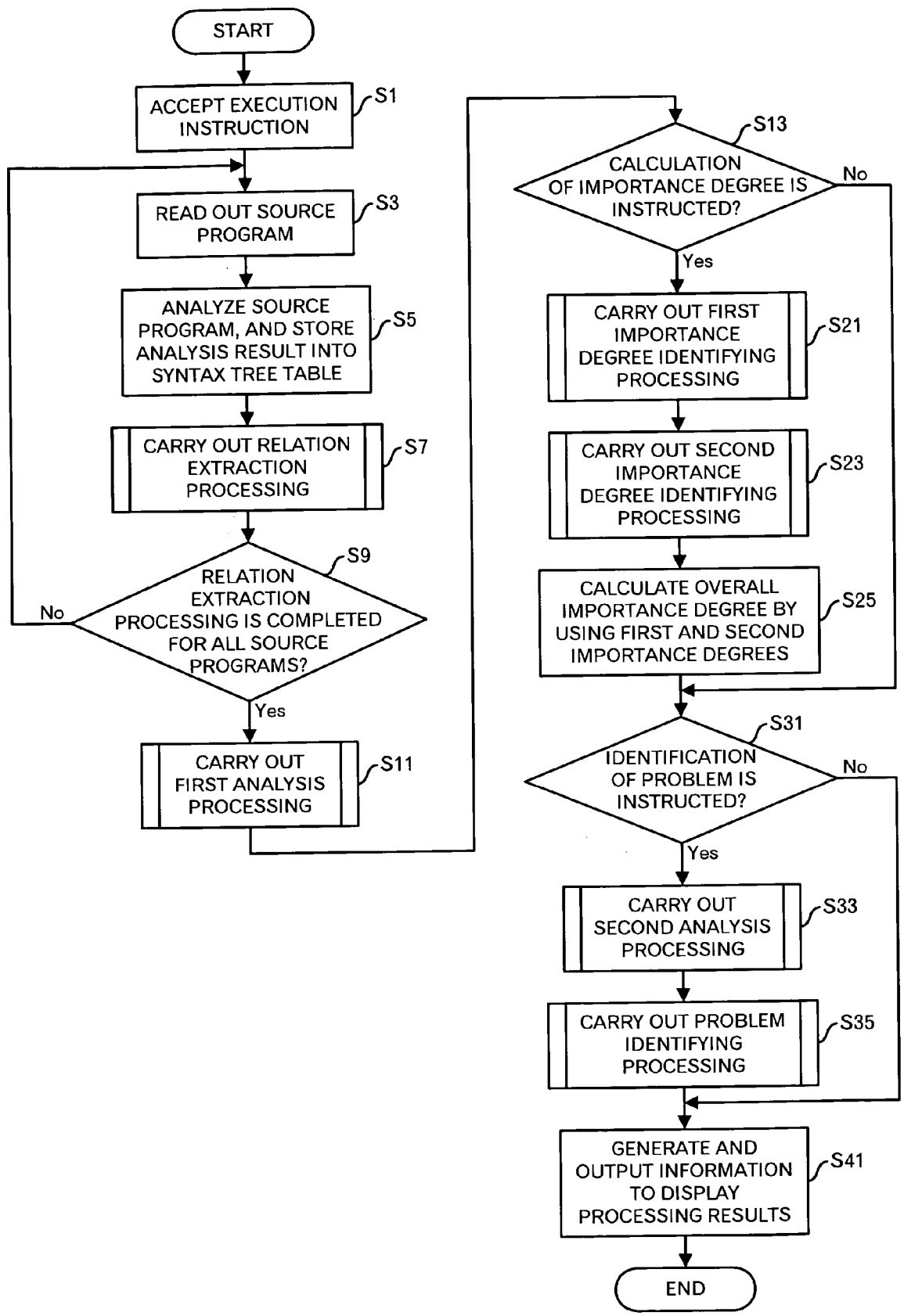
FIG. 2 is a diagram showing a processing flow in the embodiment of the present invention.

Returning to the description of the processing shown in FIG. 2, after the completion of the relation extraction processing for a certain source program, the event and entity extractor 121 judges whether or not the relation extraction processing is completed for all source programs (step S9). If it is judged that there is a source program for which the relation extraction processing has not been carried out (step S9: NO route), the processing returns to the step S3 to repeat the processing. On the other hand, if it is judged that the relation extraction processing is completed for all source programs (step S9: YES route), the analysis value calculator 133 carries out a first analysis value processing (step S11).

Figure 13:
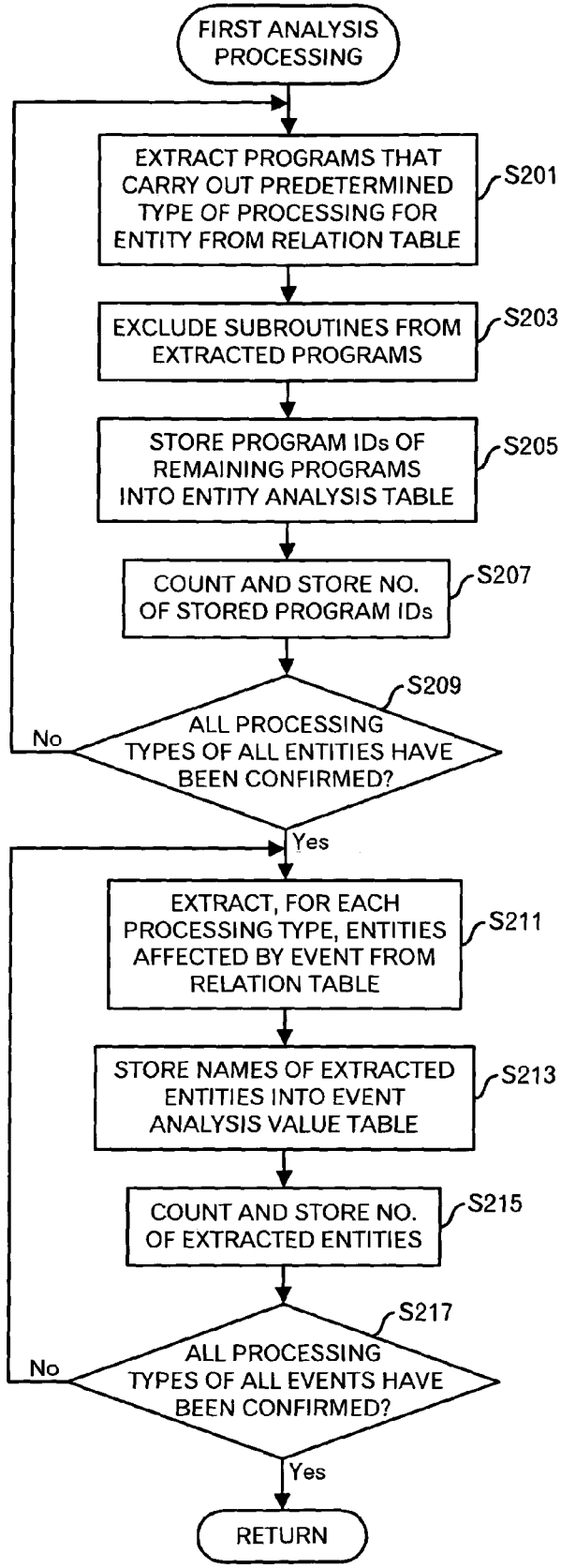
FIG. 13 is a diagram showing a processing flow of a first analysis processing.

The first analysis processing will be described with reference to FIG. 13 to FIG. 15. First, in order to identify a first analysis value of the entity, the analysis value calculator 133 refers to the relation table 131 to identify an unprocessed entity, and extracts programs that carries out a predetermined type of processing for the entity (FIG. 13: step S201).

For example, when TABLE-1 is identified in the step S201, programs that carries out the update processing for the TABLE-1 can be extracted by executing the following SQL statement, for example:

SELECT program FROM relation table
WHERE target table='TABLE-1'
AND processing='UPDATE'

It should be noted here that the processing method is not limited thereto. For example, the relation table 131 may be read out from the top by one line at a time for determination.

In this embodiment, as the execution result of the SQL statement as shown in the above, PROGRAM-1 in the line 3131, PROGRAM-2 in a line 3151, and PROGRAM-4 in a line 3171 are extracted. Subsequently, the analysis value calculator 133 excludes subroutines from the extracted programs (step S203). This is because the processing is carried out for PROGRAM-2, which corresponds to a called subroutine, separately from PROGRAM-1 and PROGRAM-4 that call PROGRAM-2, in the aforementioned relation extraction processing for the source program. In this embodiment, a program registered in the column 3015 of the called subroutine in the relation table 131 is treated as a subroutine. Hereby, PROGRAM-2 is excluded, and PROGRAM-1 and PROGRAM-4 remain.

Next, the analysis value calculator 133 stores the program IDs of the programs other than the subroutines, in association with entity names, as data indicating programs that carries out the predetermined type of processing into the entity analysis value table 141 (step S205). FIG. 14 shows an example of data stored in the entity analysis value table 141. The entity analysis value table 141 includes a column 5011 of an entity name, a column 5031 of a program which updates the entity, a column 5033 of a program which references the entity, a column 5051 of a first analysis value, a column 5053 of a second analysis value, a column 5071 of an affecting event, a column 5091 of a first importance degree, a column 5093 of a second importance degree, a column 5095 of an overall importance degree, and a column 5097 of a program. After the completion of the processing up to the step S205, data is stored in the column 5031 of the program which updates the entity and the column 5033 of the program which references the entity. For example, PROGRAM-1 and PROGRAM-4 are stored in the column 5031 of the program which updates the entity in a line 5111 of TABLE-1 as a result of the aforementioned processing. Besides, although not shown, the entity analysis value table 141 includes the column of a program which inputs data for the entity and the column of a program which deletes data for the entity. Moreover, when one program accesses a certain entity more than once, it is also possible to additionally store data indicating that the program accesses plural times.

Next, the analysis value calculator 133 counts the number of program IDs stored in the column 5031 of the program which updates the entity, and stores it as a first analysis value of the entity into the column 5051 of the first analysis value in the entity analysis value table 141 (step S207). For example, the first analysis value of TABLE-1 is set to "2." Incidentally, the first analysis value of the entity is not limited thereto, but it can be a value obtained by adding the number of program IDs stored in the column 5033 of the program which references the entity to the number of program IDs stored in the column 5031 of the program which updates the entity, for example. Moreover, for example, a point is preset for each type of processing, and the value obtained by multiplying the number of stored programs for each type of processing by the point preset for the corresponding type of processing and totaling all of the multiplications may be used as the first analysis value of the entity.

Subsequently, the analysis value calculator 133 judges whether or not the program extraction processing is completed for all processing types of all entities (step S209). Unless it is judged that the program extraction processing has been completed (step S209: NO route), the processing returns to the step S201 to repeat the processing. On the other hand, if it is judged that the program extraction processing has been completed (step S209: YES route), the processing progresses to step S211.

After identifying the first analysis values of the entities, in order to identify a first analysis value of the event, the analysis value calculator 133 identifies unprocessed events with reference to the relation table 131, and extracts entities affected by the identified event for each type of processing for the entities (step S211). In this embodiment, this processing will be described in a situation where, for example, FILE-3 is identified. The processing for identifying an unprocessed event and extracting the entities affected by the identified event can be executed in the same method as for the aforementioned processing for extracting the programs, and therefore the detailed description is omitted here. For example, when the FILE-3 is identified in the step S211, TABLE-1 in a line 3171 and TABLE-3 in a line 3191 are extracted, as entities that affects the FILE-3 and for which the UPDATE processing is carried out, from the records stored in the relation table 131 shown in FIG. 10.

Subsequently, the analysis value calculator 133 stores the entity names of the extracted entities as data indicating entities affected by the event and to be processed in the designated type of processing, in association with the event name, into the event analysis value table 143 (step S213). FIG. 15 shows an example of data stored in the event analysis value table 143. The event analysis value table 143 includes a column 6011 of an event name, a column 6031 of an entity to be updated, a column 6033 of an entity to be referenced, a column 6051 of a first analysis value, a column 6071 of a first importance degree, a column 6073 of a second importance degree, a column 6075 of an overall importance degree, and a column 6077 of a problem. After the completion of the processing up to the step S213, data is stored into the column 6031 of the entity to be updated and the column 6033 of the entity to be referenced. For example, TABLE-1 and TABLE-3 are stored in the column 6031 of the entity to be updated in a line 6115 of FILE-3 by the aforementioned processing. In addition, although not shown, the event analysis value table 143 also includes a column of an entity to be inputted and a column of an entity to be deleted. Moreover, when a certain event affects several types of processing for a certain entity, data indicating that may also be stored.

Next, the analysis value calculator 133 counts the number of entities stored in the column 6031 of the entity to be updated, and stores it as a first analysis value of the event into the column 6051 of the first analysis value in the event analysis value table 143 (step S215). For example, the first analysis value of FILE-1 is set to "2." Incidentally, the first analysis value of the event is not limited thereto similarly to the first analysis value of the entity described above, but it can be identified according to other methods.

Subsequently, the analysis value calculator 133 judges whether or not the entity extraction processing is completed for all processing types of all events (step S217). Unless it is judged that the entity extraction processing is completed (step S217: NO route), the processing returns to the step S211 to repeat the processing. On the other hand, if it is judged that the entity extraction processing is completed (step S217: YES route), the first analytical processing is terminated, and the processing returns to the original processing.

Returning to the description of the processing shown in FIG. 2, after the end of the first analysis processing, the importance degree identifying unit 145 judges whether or not the execution instruction indicates that the importance degree should be calculated (step S13). If it is judged that the importance degree should be calculated (step S13: YES route), a first importance degree identifying processing is carried out (step S21). On the other hand, unless it is judged that the importance degree should be calculated (step S13: NO route), the processing progresses to step S31.

Figure 16:
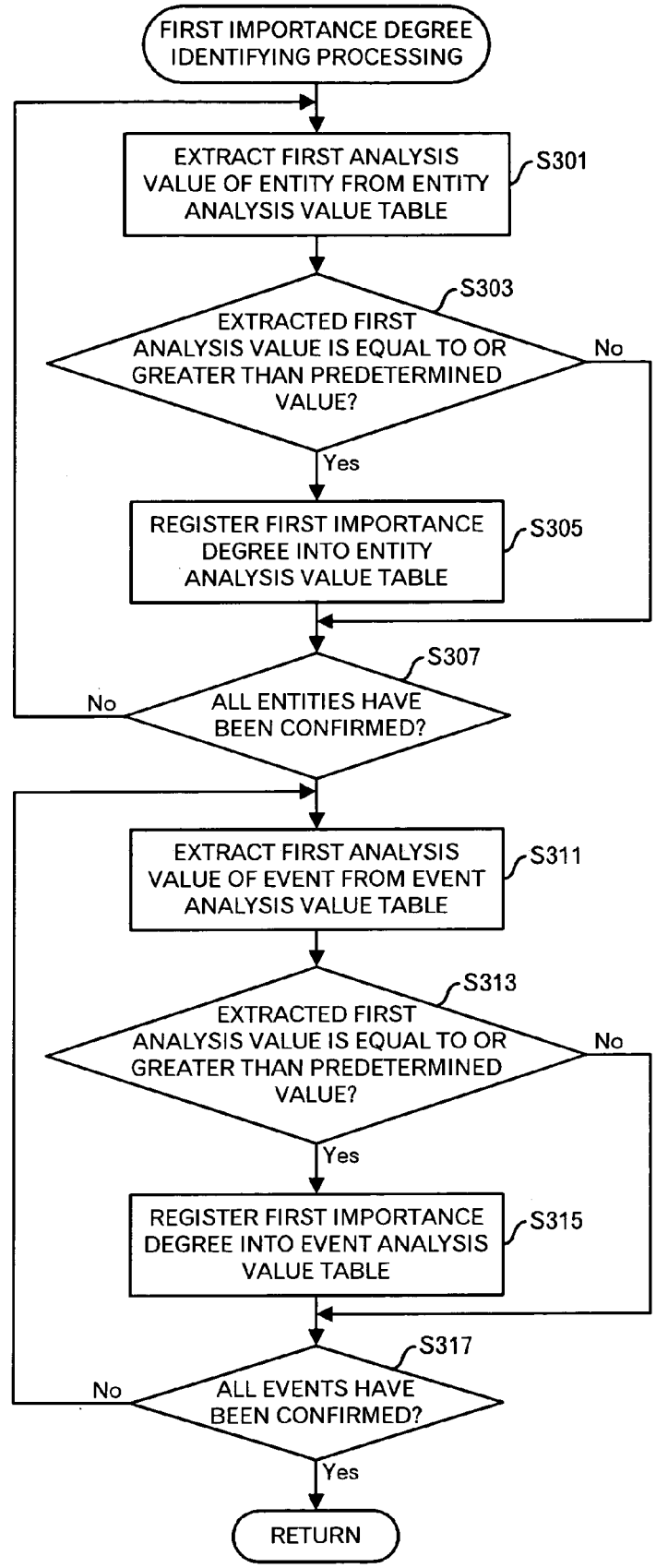
FIG. 16 is a diagram showing a processing flow of a first importance degree identifying processing.

The first importance degree identifying processing will be described with reference to FIG. 16. First, the importance degree identifying unit 145 identifies an unprocessed entity with reference to the entity analysis value table 141, and extracts the first analysis value of the identified entity (step S301). Next, the importance degree identifying unit 145 judges whether or not the extracted first analysis value is equal to or greater than a predetermined value (step S303). In this embodiment, it is assumed that the predetermined value is "2" and that the first importance degree "1" is registered for an entity whose first analysis value is equal to or greater than the predetermined value.

If the first analysis value is judged to be equal to or greater than the predetermined value (step S303: YES route), the importance degree identifying unit 145 registers the first importance degree into the entity analysis value table 141 (step S305). In this embodiment, for example, when TABLE-1 is identified in the step S301, an importance degree "1" is registered into the column 5091 of the first importance degree for the TABLE-1, because the first analysis value of the TABLE-1 is "2" as shown in FIG. 14. Thereafter, the processing progresses to step S307. On the other hand, if the first analysis value is judged to be less than the predetermined value (step S303: NO route), the processing progresses to the step S307. Incidentally, the importance degree may be determined in proportion to the first analysis value, instead of determining the importance degree according to whether or not the first analysis value is equal to or greater than the predetermined value.

Subsequently, the importance degree identifying unit 145 judges whether or the processing for identifying the first importance degree is completed for all entities (step S307). Unless it is judged that the processing is completed for all entities (step S307: NO route), the processing returns to the step S301 to repeat the processing. On the other hand, if it is judged that the processing is completed for all entities (step S307: YES route), the processing progresses to step S311.

After identifying the first importance degrees of the entities, the importance degree identifying unit 145 identifies the first importance degree of events. First, the importance degree identifying unit 145 identifies an unprocessed event with reference to the event analysis value table 143, and extracts the first analysis value of the identified event (step S311). Next, the importance degree identifying unit 145 judges whether or the extracted first analysis value is equal to or greater than a predetermined value (step S313). In this embodiment, it is assumed that the predetermined value is "2" and that the first importance degree "1" is registered for the event whose first analysis value is equal to or greater than the predetermined value.

If the first analysis value is judged to be equal to or greater than the predetermined value (step S313: YES route), the importance degree identifying unit 145 registers the first importance degree into the event analysis value table 143 (step S315). For example, when FILE-3 is identified in the step S311, an importance degree "1" is registered into the column 6071 of the first importance degree for File-3 since the first analysis value of File-3 is "2" as shown in FIG. 15. Thereafter, the processing progresses to step S317. On the other hand, if the first analysis value is judged to be less than the predetermined value (step S313: NO route), the processing progresses to the step S317. The importance degree may be determined in proportion to the first analysis value, instead of determining the importance degree according to whether or not the first analysis value is equal to or greater than the predetermined value, similarly to the first importance of the entity.

Subsequently, the importance degree identifying unit 145 judges whether or not the processing for identifying the first importance degree is completed for all events (step S317). Unless it is judged that the processing is completed for all events (step S317: NO route), the processing returns to the step S311 to repeat the processing. On the other hand, if it is judged that the processing is completed for all events (step S317: YES route), the first importance degree identifying processing is terminated, and the processing returns to the original processing.

Returning to the description of the processing shown in FIG. 2, the importance degree identifying unit 145 carries out a second importance degree identifying processing after the completion of the first importance degree identifying processing (step S23).

Figure 17:
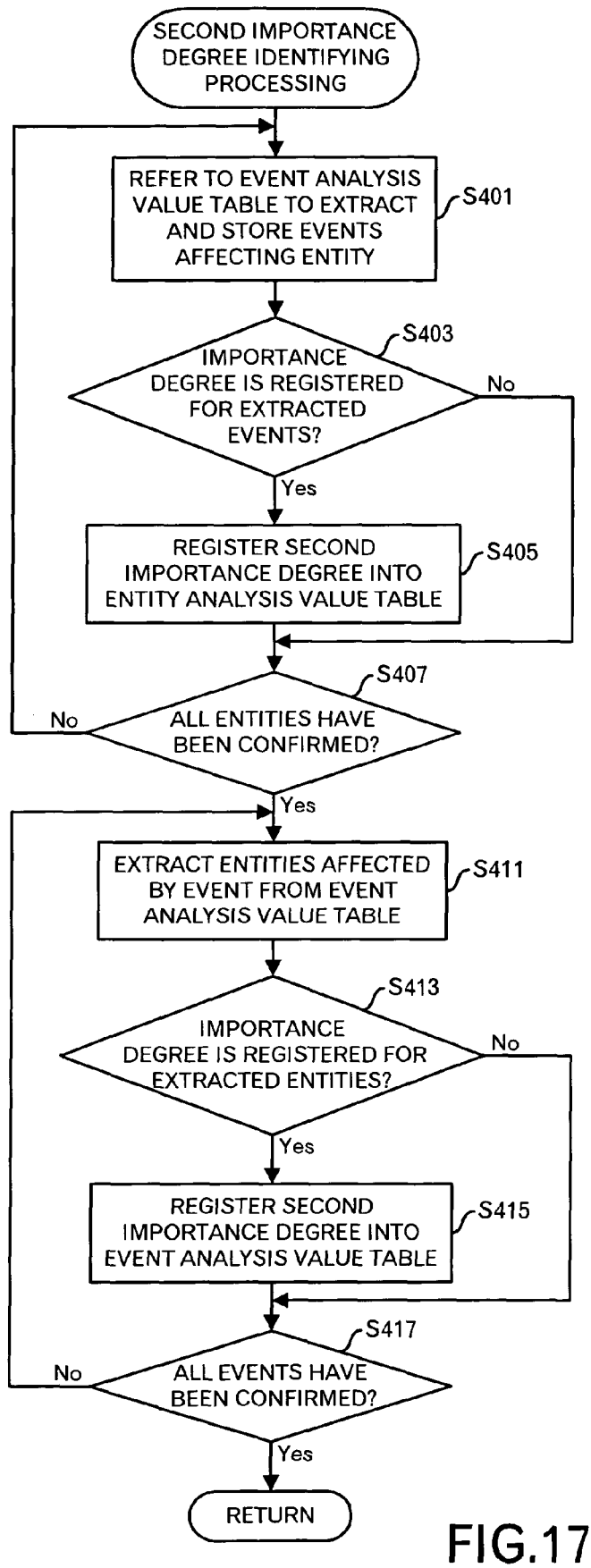
FIG. 17 is a diagram showing a processing flow of a second importance degree identifying processing.

The second importance degree identifying processing will be described with reference to FIG. 17. First, in order to identify the second importance degree of an entity, the importance degree identifying unit 145 identifies an unprocessed entity with reference to the event analysis value table 143, extracts events affecting the entity, and stores them into the entity analysis value table 141 (step S401). In FIG. 15, for example, when TABLE-1 is identified, the events affecting TABLE-1 are FILE-1, FILE-2, FILE-3, GAMEN-1, and GAMEN-2. These event names are registered into the column 5071 of the affecting event in the entity analysis value table 141 shown in FIG. 14. Incidentally, the affecting events may be extracted with being limited to specific processing types, though all types of processings are processed in this embodiment. In this instance, the event names of the affecting events may be stored for each processing type into the entity analysis value table 141.

Subsequently, the importance degree identifying unit 145 judges whether or not the first importance degree is registered for the extracted events (step S403). If the first importance degree is registered (step S403: YES route), the importance degree identifying unit 145 registers the second importance degree for the entity affected by the events into the entity analysis value table 141 (step S405). In this embodiment, it is assumed that "1" is registered as the second importance degree of the entity, if the first importance degree is registered for the events. Thereafter, the processing progresses to step S407. On the other hand, unless the first importance degree is registered (step S403: NO route), the processing progresses to the step S407. Incidentally, when the second importance degree has already been registered for the events, the second importance degree may be used.

In the example shown in FIG. 14 and FIG. 15, the first importance degree is registered for FILE-1 and FILE-3 among the events affecting TABLE-1. Therefore, an importance degree "1" is registered into the column 5093 of the second importance degree for TABLE-1. In addition, the second importance degree may be identified by using the number of events for which the first importance degree is registered or the sum of the first importance degree of the events, instead of the presence or absence of the first importance degree of the events. For example, when the sum of the first importance degree of the events is used, the first importance degree is registered for both of the FILE-1 and FILE-3 in the aforementioned example and therefore the second importance degree of the TABLE-1 is "2."

Subsequently, the importance degree identifying unit 145 judges whether or not the processing for identifying the second importance degree is completed for all entities (step S407). Unless it is judged that the processing is completed for all entities (step S407: NO route), the processing returns to the step S401 to repeat the processing. On the other hand, if it is judged that the processing is completed for all entities (step S407: YES route), the processing progresses to step S411.

After identifying the second importance degree of the entities, the importance degree identifying unit 145 identifies the second importance degree of events. First, the importance degree identifying unit 145 identifies an unprocessed event with reference to the event analysis value table 143, and extracts entities affected by the identified event (step S411). For example, when FILE-3 is identified, the entities affected by the FILE-3 are TABLE-1 and TABLE-3 as shown in FIG. 15. In addition, the affected entities may be extracted with being limited to specific processing types, though all types are processed in this embodiment.

Next, the importance degree identifying unit 145 judges whether or not the first importance degree is registered for the extracted entities (step S413). If the first importance degree is registered (step S413: YES route), the importance degree identifying unit 145 registers the second importance degree of the event being processed into the event analysis value table 143 (step S415). In this embodiment, it is assumed that "1" is registered as the second importance degree of the event when the first importance degree is registered for the extracted entities. Thereafter, the processing progresses to step S417. On the other hand, unless the first importance degree is registered (step S413: NO route), the processing progresses to the step S417.

In the example shown in FIG. 14 and FIG. 15, the first importance degree "1" is registered for both of the TABLE-1 and TABLE-3, which are the entities affected by FILE-3. Therefore, the importance degree "1" is registered in the column 6073 of the second importance degree for the FILE-3. In addition, the second importance degree of the event may also be identified by other methods similarly to the second importance degree of the entities.

Subsequently, the importance degree identifying unit 145 judges whether or not the processing for identifying the second importance degree is completed for all events (step S417). Unless it is judged that the processing is completed for all events (step S417: NO route), the processing returns to the step S411 to repeat the processing. On the other hand, if it is judged that the processing is completed for all events (step S417: YES route), the second importance degree identifying processing is terminated, and the processing returns to the original processing.

Returning to the description of the processing shown in FIG. 2, the importance degree identifying unit 145 calculates the overall importance degree of the event and that of the entity by using the first importance degree identified in the step S21 and the second importance degree identified in the step S23, and stores them into the event analysis value table 143 and the entity analysis value table 141, respectively (step S25). The overall importance degree may be calculated, for example, by simply adding the first importance degree and the second importance degree to each other or by addition or multiplication of the weighted first importance degree and the weighted second importance degree. In this embodiment, a value obtained by multiplying the first importance degree by "0.7" is added to a value obtained by multiplying the second importance degree by "0.3." Therefore, when the first importance degree and the second importance degree are both set to "1" as shown in a line 6115 for the FILE-3 in FIG. 15, for example, the overall importance degree becomes "1." In the same manner, when the first importance degree is set to "0" and the second importance degree is set to "1" as shown in a line 6151 for GAMEN-1, the overall importance degree is "0.3." Conversely, when the first importance degree is set to "1" and the second importance degree is set to "0" as shown in a line 6191 for GAMEN-31, the overall importance degree is "0.7."

Subsequently, the problem identifying unit 155 judges whether or not the execution instruction indicates that an entity or event having a problem should be identified (step S31). If it is judged that the execution instruction indicates that such identification should be carried out (step S31: YES route), a second analysis processing is carried out (step S33). The second analysis processing will be described with reference to FIG. 18 to FIG. 20. On the other hand, unless it is judged that the execution instruction indicates such identification should be carried out (step S31: NO route), the processing progresses to step S41.

Figure 18:
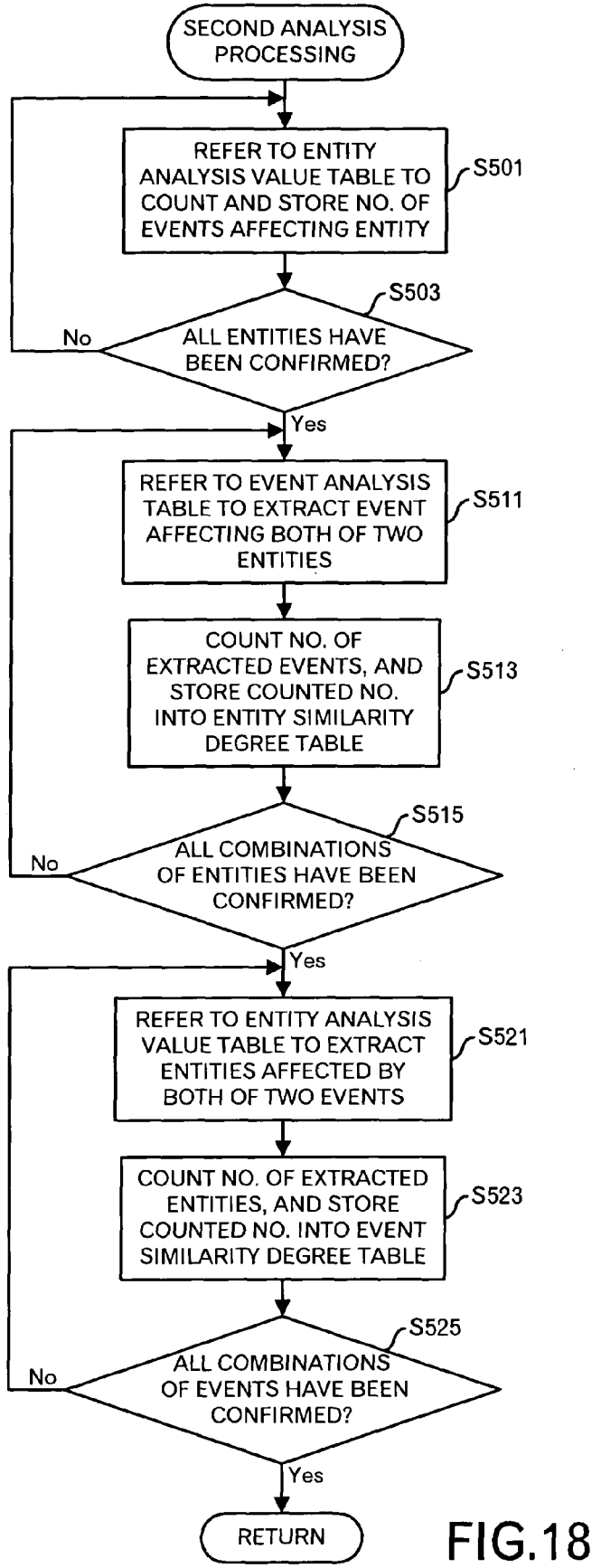
FIG. 18 is a diagram showing a processing of a second analysis processing.

First, the problem identifying unit 155 identifies an unprocessed entity with reference to the entity analysis value table 141 in order to identify a second analysis value of an entity, and then counts the number of events affecting the identified entity, and stores the counted number of events into the storage device (FIG. 18: step S501). For example, when TABLE-1 is identified, five events are registered into the column 5071 of the affecting event in a line 5111 for the TABLE-1 and therefore "5" is registered into the column 5053 of the second analysis value, as shown in FIG. 14. In addition, the events may be counted with being limited to specific processing types similarly to the second importance degree identifying processing.

Next, the problem identifying unit 155 judges whether the event counting is completed for all entities (step S503). Unless it is judged that the counting is completed for all entities (step S503: NO route), the processing returns to the step S501 to repeat the processing. On the other hand, if it is judged that the counting is completed for all entities (step S503: YES route), the processing progresses to step S511.

The problem identifying unit 155 then identifies two unprocessed entities with reference to the event analysis value table 143, and extracts events affecting both of the entities in order to calculate a similarity degree between one entity and the other entity (step S511). In this embodiment, the problem identifying unit 155 extracts events for which the two entities are registered in at least one of the column 6031 of the entity to be updated and the column 6033 of the entity to be referenced in the event analysis value table 143. In addition, focusing on the processing type for the entities, the problem identifying unit 155 may extract only events for which the two entities are registered, for example, in the column 6031 of the entity to be updated.

Thereafter, the problem identifying unit 155 counts the number of extracted events, and stores the counted number of extracted events as an inter-entity similarity into the entity similarity degree table 151 (step S513). FIG. 19 shows an example of data stored in the entity similarity degree table 151. The entity similarity degree table 151 includes a column 7011 of an entity 1, a column 7031 of an entity 2, and a column 7051 of a similarity degree. For example, when TABLE-1 and TABLE-2 are identified in the step S511, FILE-1 and GAMEN-1 affect both of the entities as shown in FIG. 15. In this case, a value "2" is stored into the column 7051 of the similarity degree in a line 7101 of the entity similarity degree table 151. On the other hand, for example, when TABLE-1 and TABLE-3 are identified in the step S511, only FILE-3 is the event affecting both of the TABLE-1 and TABLE-3, and therefore a value "1" is stored into the column 7051 of the similarity degree as shown in a line 7111 of the entity similarity degree table 151.

Incidentally, the number of events affecting both entities is used as a similarity degree in this embodiment. However, the similarity degree may be calculated by using, for example, the importance degrees set for the events. Furthermore, the event names of the events may also be stored in addition to the number of events affecting both of the entities in common into the entity similarity degree table 151. In addition, when extracting the events affecting both of the two entities, the problem identifying unit 155 may reference the entity analysis value table 141, instead of the event analysis value table 143.

Next, the problem identifying unit 155 judges whether or not the similarity degree calculation processing is completed for all combinations of the entities (step S515). Unless it is judged that the similarity degree calculation processing is completed for all combination of the entities (step S515: NO route), the processing returns to the step S511 to repeat the processing. On the other hand, if it is judged that the similarity degree calculation processing is completed for all combinations of the entities (step S515: YES route), the processing progresses to step S521.

Thereafter, in order to calculate the similarity degree between one event and the other event, the problem identifying unit 155 identifies two unprocessed events with reference to the entity analysis value table 141, and extracts entities affected by both of the identified events (step S521). In this embodiment, the problem identifying unit 155 extracts entities for which both events are registered in the column 5071 of the event which affects the entity in the entity analysis value table 141. In addition, focusing on the processing type for the entities, the problem identifying unit 155 may extract the entities only when the two events affect, for example, the update processing for the entities.

Thereafter, the problem identifying unit 155 counts the number of extracted entities, and stores the counted number of extracted entities as an inter-event similarity degree into the event similarity degree table 153 (step S523). FIG. 20 shows an example of data stored in the event similarity degree table 153. The event similarity degree table 153 includes a column 8011 of an event 1, a column 8031 of an event 2, and a column 8051 of a similarity degree. For example, when GAMEN-1 and GAMEN-2 are identified in the step S521, both events are registered into the column 5071 of the event which affects the entity as shown in the line 5111 for TABLE-1 in FIG. 14. In this case, only TABLE-1 is the entity affected by both of the two events, and therefore a value "1" is stored into the column 8051 of the similarity degree in a line 8101 of the event similarity degree table 153. When extracting entities affected by both of the two events, the problem identifying unit 155 may reference the event analysis value table 143, instead of the entity analysis value table 141. For example, when referencing a line 6171 of GAMEN-3 and a line 6191 of GAMEN-31 in the event analysis value table 143, it is understood that TABLE-2, TABLE-7, TABLE-17, and TABLE-25 are registered as entities common to the two events. Therefore, for example, when GAMEN-3 and GAMEN-31 are identified in the step S521, a value "4" is stored into the column 8051 of the similarity degree as shown in a line 8131 of the event similarity degree table 153.

While the number of entities affected by both of the two events is used as a similarity degree in this embodiment, the similarity degree may be calculated by using, for example, the importance degrees set for the entities. Furthermore, the entity name may also be stored in addition to the number of extracted entities into the event similarity degree table 153.

Subsequently, the problem identifying unit 155 judges whether or not the similarity degree calculation processing is completed for all combinations of the events (step S525). Unless it is judged that the similarity degree calculation processing is completed for all combinations of the events (step S525: NO route), the control returns to the step S521 to repeat the processing. On the other hand, if it is judged that the similarity degree calculation processing is completed for all combinations of the entities (step S525: YES route) the second analysis processing is terminated, and the processing returns to the original processing.

Returning to the description of the processing shown in FIG. 2, the problem identifying unit 155 carries out a problem identifying processing after the completion of the second analysis processing (step S35). The problem identifying processing will be described with reference to FIG. 21 and FIG. 22.

Figure 21:
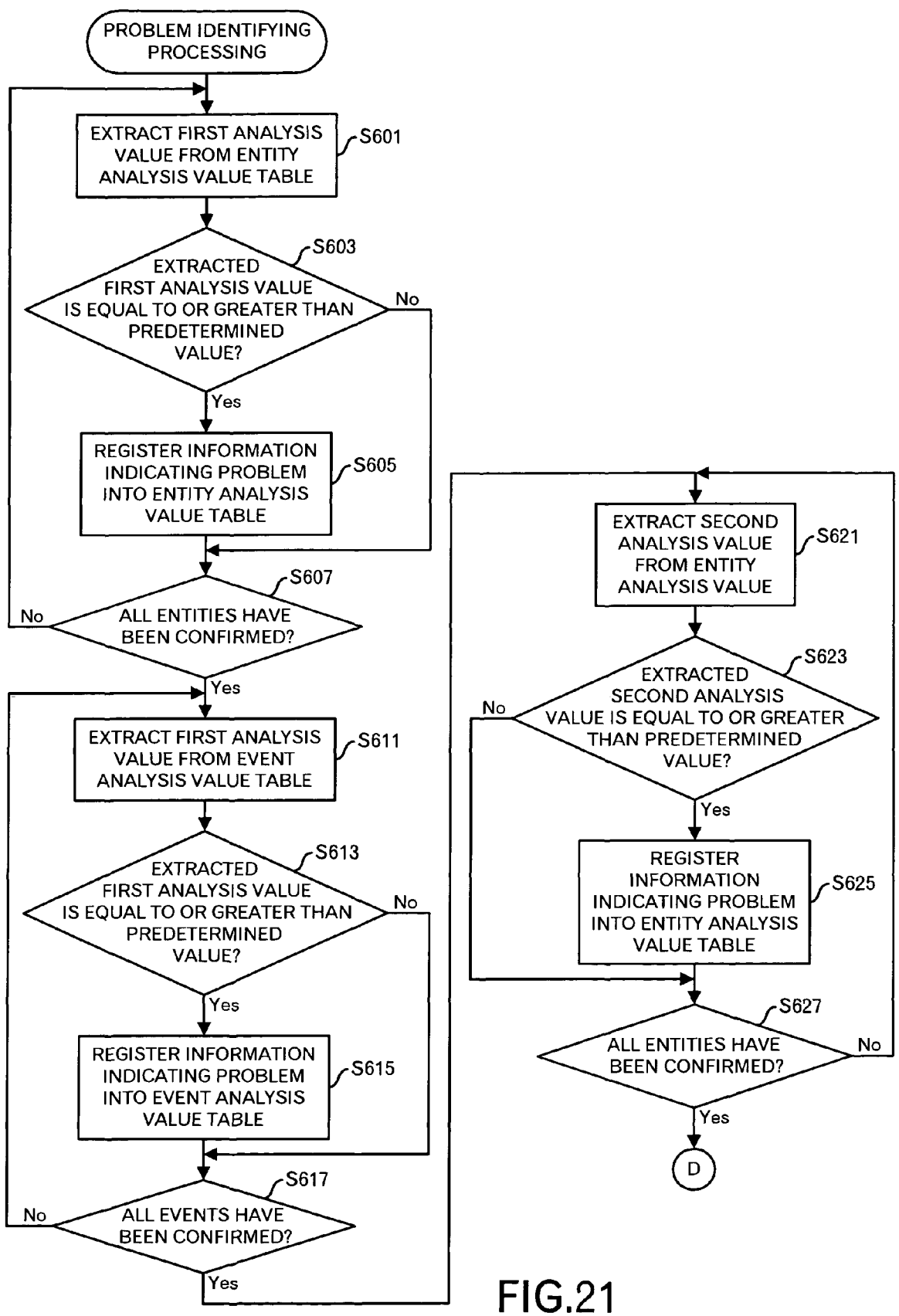
FIG. 21 is a diagram showing a processing flow of a problem identifying processing.
Figure 22:
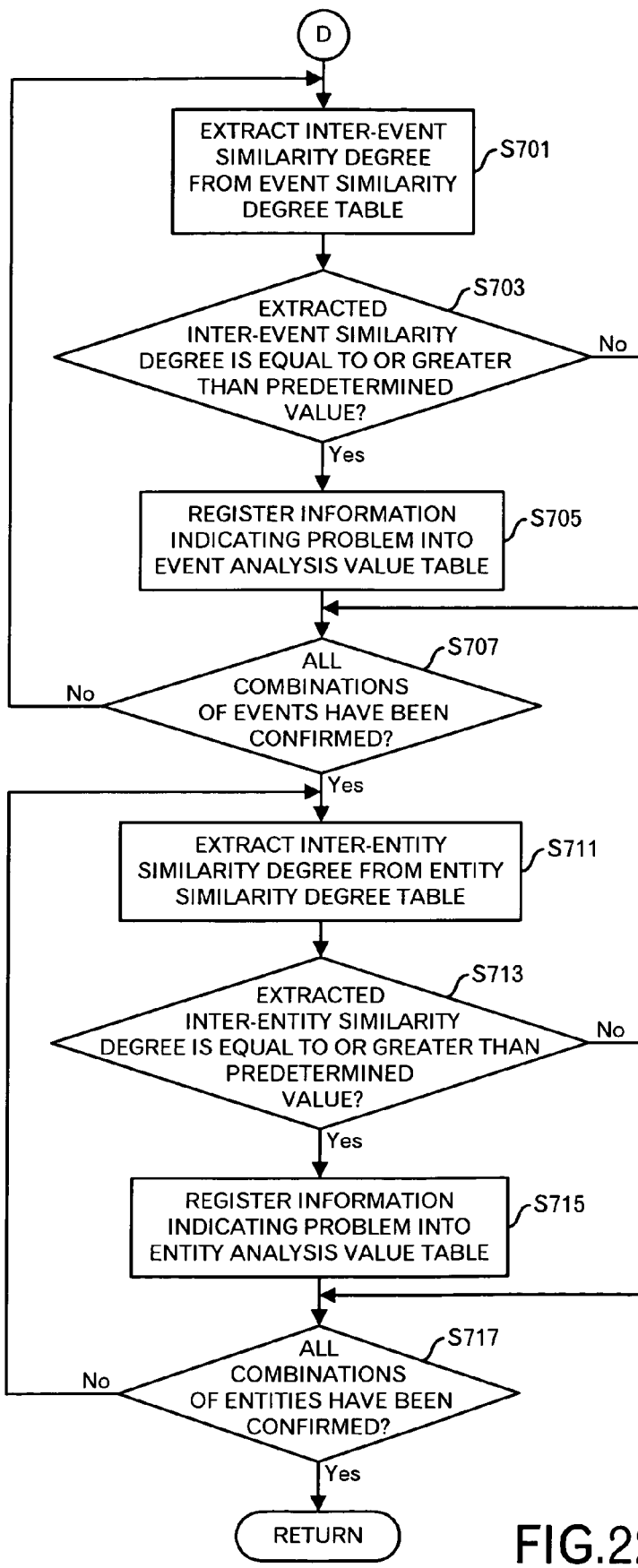
FIG. 22 is a diagram showing a processing flow of a problem identifying processing.

First, the problem identifying unit 155 extracts the first analysis value of an entity with reference to the entity analysis value table 141 (FIG. 21: step S601). It then judges whether or not the extracted first analysis value is equal to or greater than a predetermined value (step S603). In this embodiment, it is assumed that the predetermined value is "5" and that information indicating the entity has a problem is registered for the entity whose first analysis value is equal to or greater than the predetermined value.

If it is judged that the first analysis value is equal to or greater than the predetermined value (step S603: YES route), the problem identifying unit 155 registers the information indicating that the entity has a problem into the entity analysis value table 141 (step S605). Thereafter, the processing progresses to step S607. In this embodiment, the first analysis value of TABLE-10 is "5" as shown in a line 5131 in FIG. 14, and therefore it is registered that TABLE-10 has a problem that "the number of programs exceeds." On the other hand, if it is judged that the first analysis value is less than the predetermined value (step S603: NO route), the processing progresses to the step S607. Because there is no entity whose first analysis value is equal to or greater than "5" in its line other than the line 5131 in FIG. 14, no information indicating there is a problem is registered in other lines in FIG. 14. In addition, a numerical degree of a problem may be registered instead of the information indicating there is a problem, and the degree of the problem may be determined in proportion to the first analysis value instead of determining the presence or absence of a problem according to whether or not the value is equal to or greater than the predetermined value.

Subsequently, the problem identifying unit 155 judges whether or not the processing is completed for all entities (step S607). Unless it is judged that the processing is completed for all entities (step S607: NO route), the control returns to the step S601 to repeat the processing. On the other hand, if it is judged that the processing is completed for all entities (step S607: YES route), the processing progresses to step S611.

Next, the problem identifying unit 155 extracts the first analysis value of an event with reference to the event analysis value table 143 (step S611). Then, the problem identifying unit 155 judges whether the extracted first analysis value is equal to or greater than a predetermined value (step S613). In this embodiment, it is assumed that the predetermined value is "6" and that information indicating there is a problem is registered for an event whose first analysis value is equal to or greater than the predetermined value.

If the first analysis value is equal to or greater than the predetermined value (step S613: YES route), the problem identifying unit 155 registers data indicating that the entity has a problem into the column 6077 of the problem in the event analysis value table 143 (step S615). Thereafter, the processing progresses to step S617. In this embodiment, the first analysis value of FILE-14 is "8" as shown in a line 6131 in FIG. 15, and therefore it is registered that the FILE-14 has a problem that "the number of entities exceeds." On the other hand, if the first analysis value is less than the predetermined value (step S613: NO route), the processing progresses to the step S617. Because there is no event whose first analysis value is equal to or greater than "6" in its line other than the line 6131 in FIG. 15, no information indicating there is a problem is registered in other lines in FIG. 15. In addition, a numerical degree of a problem may be registered instead of the information indicating there is a problem, and the degree of the problem may be determined in proportion to the first analysis value instead of determining the presence or absence of the problem according to whether or not the value is equal to or greater than the predetermined value.

Subsequently, the problem identifying unit 155 judges whether or not the processing is completed for all events (step S617). Unless it is judged that the processing is completed for all events (step S617: NO route), the control returns to the step S611 to repeat the processing. On the other hand, if it is judged that the processing is completed for all events (step S617: YES route), the processing progresses to step S621.

Next, the problem identifying unit 155 extracts the second analysis value of an entity with reference to the entity analysis value table 141 (step S621). Then, the problem identifying unit 155 judges whether or not the extracted second analysis value is equal to or greater than a predetermined value (step S623). In this embodiment, it is assumed that the predetermined value is "10" and that information indicating there is a problem is registered for an entity whose second analysis value is equal to or greater than the predetermined value.

If it is judged that the second analysis value is equal to or greater than the predetermined value (step S623: YES route), the problem identifying unit 155 stores information indicating that the entity has a problem into the entity analysis value table 141 (step S625). Thereafter, the processing progresses to step S627. The second analysis value of TABLE-11 is "19" as shown in a line 5151 of FIG. 14, and therefore it is registered that TABLE-11 has a problem that "the number of events exceeds." On the other hand, if it is judged that the second analysis value is less than the predetermined value (step S623: NO route), the processing progresses to the step S627. Because there is no entity whose second analysis value is equal to or greater than "10" in its line other than the line 5151 in FIG. 14, no information indicating there is a problem is registered into other lines in FIG. 14. In addition, a numerical degree of a problem may be registered instead of the information indicating there is a problem, and the degree of the problem may be determined in proportion to the second analysis value instead of determining the presence or absence of the problem according to whether or not the value is equal to or greater than the predetermined value.

Subsequently, the problem identifying unit 155 judges whether or not the processing is completed for all entities (step S627). Unless it is judged that the processing is completed for all entities (step S627: NO route), the control returns to the step S621 to repeat the processing. On the other hand, if it is judged that the processing is completed for all entities (step S627: YES route), the processing progresses to a processing flow shown in FIG. 22 via a terminal D.

Next, the problem identifying unit 155 identifies a problem of an event on the basis of the inter-event similarity degree. First, the problem identifying unit 155 extracts the inter-event similarity degree with reference to the event similarity degree table 153 (FIG. 22: Step S701). It then judges whether or not the extracted inter-event similarity degree is equal to or greater than a predetermined value (step S703). In this embodiment, the predetermined value is assumed to be "3." If the inter-event similarity degree is less than the predetermined value (step S703: NO route), the processing progresses to step S707.

On the other hand, if the inter-event similarity degree is equal to or greater than the predetermined value (step S703:

YES route), the problem identifying unit 155 registers information indicating there is a problem into the event analysis value table 143 in association with both events (step S705). In this embodiment, the inter-event similarity degree between GAMEN-3 and GAMEN-31 is "4" as shown in a line 8131 in FIG. 20. In this case, information indicating that there is a similar event is registered into the column 6077 of the problem for both of the line 6171 of GAMEN-3 and the line 6191 of GAMEN-31 in the event analysis value table 143. Thereafter, the processing progresses to step S707.

Next, the problem identifying unit 155 judges whether or not the processing is completed for all combinations of events (step S707). Unless it is judged that the processing is completed for all combinations of the events (step S707: NO route), the control returns to the step S701 to repeat the processing. On the other hand, if it is judged that the processing is completed for all combinations of the events (step S707: YES route), the processing progresses to step S711.

Thereafter, the problem identifying unit 155 identifies a problem of entities on the basis of the inter-entity similarity degree. First, the problem identifying unit 155 extracts the inter-entity similarity degree with reference to the entity similarity degree table 151 (Step S711). It then judges whether or not the extracted inter-entity similarity degree is equal to or greater than a predetermined value (step S713). In this embodiment, the predetermined value is assumed to be "3." If the inter-entity similarity degree is less than the predetermined value (step S713: NO route), the processing progresses to the step S717.

On the other hand, if the similarity is equal to or greater than the predetermined value (step S713: YES route), the problem identifying unit 155 registers information indicating there is a problem into the entity analysis value table 141 in association with both entities (step S715). Thereafter, the processing progresses to the step S717. In this embodiment, the inter-entity similarity degree between TABLE-1 and TABLE-2 is "2" and the inter-entity similarity degree between TABLE-1 and TABLE-3 is "1" as shown in FIG. 19. Therefore, no information indicating there is a problem is registered regarding TABLE-1 to TABLE-3.

Subsequently, the problem identifying unit 155 judges whether or not the processing is completed for all combinations of entities (step S717). Unless it is judged that the processing is completed for all combinations of the entities (step S717: NO route), the control returns to the step S711 to repeat the processing. On the other hand, if it is judged that the processing is completed for all combinations of the entities (step S717: YES route), the problem identifying processing is terminated, and the processing returns to the original processing.

Returning to the description of the processing shown in FIG. 2, the output information generator 161 generates information to display processing results with reference to the entity analysis value table 141 and the event analysis value table 143, and stores it into the output information storage 163 (step S41). Thereafter, the output unit 171 reads out information to display the processing results from the output information storage 163, and outputs the information. The output unit 171 may include an output device such as a display or a printer or a communication device for transmitting data to other computers such as user terminals.

Figures 23, 26:
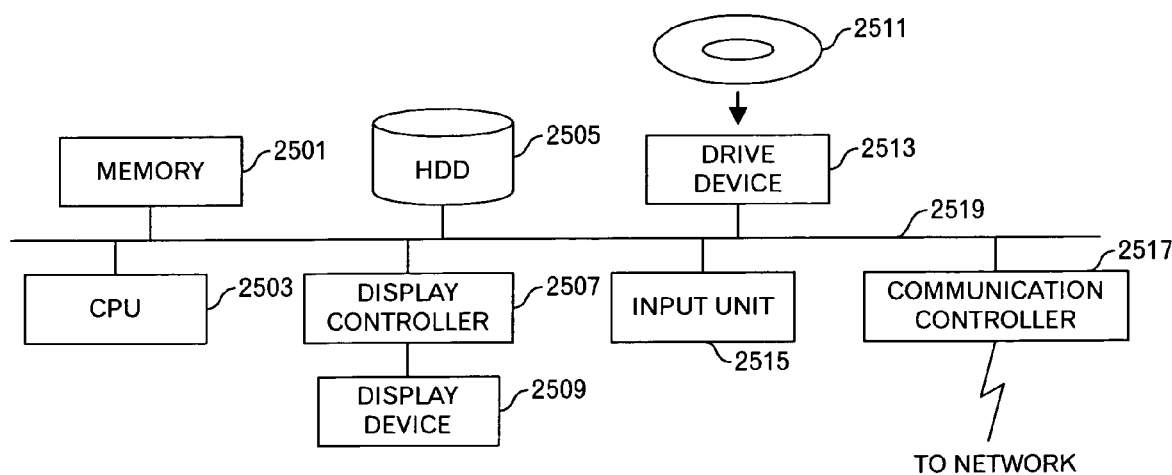
FIG. 23 is a diagram showing an example of an output screen to display processing results in the embodiment of the present invention.
FIG. 26 is a functional block diagram of a computer.

FIG. 23 to FIG. 25 respectively show an example of a screen on which the processing results are displayed. FIG. 23 shows an example of a screen to overview the importance degrees and problems of the entities identified in the processing described above in a tabular form. In FIG. 23, the entity names are changed to names easily understood by the user. Although an entity for which the importance degree is set is marked with a circle as shown in the line of the item number 3 in FIG. 23 and an entity determined to have a problem is marked with a cross as shown in the line of the item number 4 in FIG. 23, it is also possible to present only one of the problem and the importance. In addition, only entities for which the importance degree is set or entities determined to have a problem may be extracted for presentation, instead of listing all entities.

FIG. 24 shows an example of a screen to present the result of determining the importance degrees of entities and events in more detail. In a message box 2401, events and entities for which the importance degree is set are described together with their importance degrees. Furthermore, as shown in cells 2411, 2421, and 2431 in the table, the entity and events for which the importance degree is set are highlighted. With the presentation of this type of table, the user can easily understand the importance degrees of entities and events based on the relation between the entities and the events.

FIG. 25 shows an example of a screen to present the result of determining the problems of the entities and events in more detail. In a message box 2501, events and entities determined to have a problem are presented together with the content of the problem. Additionally, for example, a frame 2511 in the table shows that there are too many events affecting an entity TABLE-11. For example, a frame 2521 and a frame 2523 in the table show that GAMEN-3 and GAMEN-31 are similar in the combination of entities affected by them. With the presentation of this type of table, the user can easily understand that some of the entities and events have a problem on the basis of the relation between the entities and the events.

While the embodiment of the present invention has been described hereinabove, it is to be understood that the subject matter encompassed by the present invention is not limited to the specific embodiment. For example, although the functional block diagram of the analysis apparatus 1 has been illustrated in FIG. 1, it does not always conform to an actual program module configuration.

Furthermore, the structure of data stored in each storage is not limited to the embodiment described above, but a specific example may be cut off to another table or plural tables may be integrated into one table. Moreover, the data shown in each table exemplifies a part of the whole, and therefore it may include other lines or columns, which are not shown.

The processing order shown in each processing flow is illustrative only. For example, the first analysis processing may be carried out immediately before the first importance identifying processing or the second analysis processing. Furthermore, only entities or events may be considered as targets for the analysis.

Incidentally, the aforementioned analysis apparatus 1 is a computer device as shown in FIG. 26. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A program analysis method, comprising:

generating, with a processor, a syntax tree including nodes and links between said nodes, from source programs;

tracing, with said processor, said nodes in said syntax tree along an execution route of corresponding statements included in said source programs to identify an entity that is an information unit as an object of a processing in said source program and an event affecting the processing for said entity;

storing said entity into a relation table stored in a memory in association with said event;

identifying, with said processor, identification information of said source program for carrying out the processing for said entity and a type of said processing;

storing said identification information of said source program and said type of said processing into said relation table stored in said memory in association with said entity;

calculating, with said processor, importance degrees of events by using data stored in said relation table;

identifying, with said processor, an event affecting a processing for a specific entity by using said data stored in said relation table;

calculating, with said processor, an influence degree of said specific entity by using said importance degree of the identified event;

counting, with said processor, a number of source programs for carrying out a processing of a specified type for said specific entity by using said data stored in said relation table;

calculating, with said processor, a utilization degree of said specific entity by using the counted number of source programs; and calculating, with said processor, an overall importance degree of said specific entity by using said utilization degree of said specific entity and said influence degree of said specific_entity, wherein said importance degree, said influence degree, said utilization degree and said overall importance degree are different each other.

2. The program analysis method as set forth in claim 1, wherein said calculating said importance degrees of said events comprises:

counting a number of entities as objects of processings affected by a specific event by using said data stored in said relation table; and calculating an importance degree of said specific event by using the counted number of entities.

3. A program analysis method, comprising:

generating, with a processor, a syntax tree including nodes and links between said nodes, from source programs;

tracing, with said processor, said nodes in said syntax tree along an execution route of corresponding statements included in said source programs to identify an entity that is an information unit as an object of a processing in said source program and an event affecting the processing for said entity;

storing said entity into a relation table stored in a memory in association with said event;

calculating, with said processor, importance degrees of entities by using data stored in said relation table; and identifying, with said processor, an entity as an object of a processing affected by a specific event by using said data stored in said relation table;

calculating, with said processor, an influence degree of said specific event by using said importance degree of the identified entity;

counting, with said processor, a number of entities as objects of processings affected by said_specific event by using said data stored in said relation table;

calculating, with said processor, an utilization degree of said specific event by using the counted number of entities; and calculating, with said processor, an overall importance degree of said specific event by using said utilization degree of said specific event and said influence degree of said specific event, and wherein said importance degree, said influence degree, said utilization degree and said overall importance degree are different each other.

4. The program analysis method as set forth in claim 3, wherein said storing comprises:

storing identification information of said source program for carrying out a processing for an entity and a type of said processing into said relation table in association with said entity, and said calculating said importance degrees of said entities comprises:

counting a number of source programs for carrying out a processing of a specific type for a specific entity; and calculating an importance degree of said specific entity by using the counted number of programs.

5. A program analysis method, comprising:

generating, with a processor, a syntax tree including nodes and links between said nodes, from source programs;

tracing, with said processor, said nodes in said syntax tree along an execution route of corresponding statements included in said source programs to identify an entity that is an information unit as an object of a processing in said source program and an event affecting the processing for said entity;

storing said entity into a relation table stored in a memory in association with said event;

counting, with said processor, a number of events affecting both of a processing for a first entity and a processing for a second entity different from said first entity;

calculating, with said processor, an inter-entity similarity degree representing similarity between said first entity and said second entity by using the counted number of events; and upon detecting that said inter-entity similarity degree is greater than a first value, storing, in said memory, data indicating said first entity and said second entity have a problem concerning similarity of entities.

6. The program analysis method as set forth in claim 5, further comprising:

counting, for each entity, a number of events affecting a processing for said entity by using said data stored in said relation table; and identifying an entity having a counted number of events greater than a second value, and storing data indicating the identified entity has a problem.

7. The program analysis method as set forth in claim 5, wherein said storing said entity comprises:

storing identification information of said source program for carrying out a processing for an entity and a type of said processing into said relation table in association with said entity, and said program analysis method further comprises:

counting, for each entity, a number of source programs for carrying out a processing of a specific type for said entity; and identifying an entity whose number of source programs is greater than a third value, and storing data indicating the identified entity has a problem.

8. A program analysis method, comprising:

generating, with a processor, a syntax tree including nodes and links between said nodes, from source programs;

tracing, with said processor, said nodes in said syntax tree along an execution route of corresponding statements included in said source programs to identify an entity that is an information unit as an object of a processing in said source program and an event affecting the processing for said entity;

storing said entity into a relation table stored in a memory in association with said event;

counting, with said processor, a number of entities to be an object of a processing affected by a first event and an object of a processing affected by a second event different from said first event by using data stored in said relation table;

calculating, with said processor, an inter-event similarity degree representing similarity between said first event and said second event by using the counted number of entities; and upon detecting that said inter-event similarity degree is greater than a first value, storing, in said memory, data indicating that said first event and said second event have a problem concerning similarity of events.

9. The program analysis method as set forth in claim 8, further comprising:

counting, for each event, a number of entities as objects of processings affected by said event, by using said data stored in said relation table; and identifying an event whose number of entities is greater than a second value; and storing data indicating the identified event has a problem.

10. A program analysis apparatus, comprising:

a syntax tree analyzer to generate a syntax tree including nodes and links between said nodes, from source programs;

an extractor to trace said nodes in said syntax tree along an execution route of corresponding statements included in said source programs to identify an entity that is an information unit as an object of a processing in said source program and an event affecting a processing for said entity, and to store said entity into a relation table in association with said event;

a calculation unit to calculate importance degrees of events by using data stored in said relation table;

an identification unit to identify an event affecting a processing for a specific entity by using said data stored in said relation table, and calculate an influence degree of said specific entity by using said importance degree of the identified event;

a counter to count a number of source programs for carrying out a processing of a specified type for said specific entity by using said data stored in said relation table;

a second calculation unit to calculate a utilization degree of said specific entity by using the counted number of source programs; and a third calculation unit to calculate an overall importance degree of said specific entity by using said utilization degree of said specific entity and said influence degree of said specific entity, wherein said importance degree, said influence degree, said utilization degree and said overall importance degree are different each other.

11. A program analysis apparatus, comprising:

a syntax tree analyzer to generate a syntax tree including nodes and links between said nodes, from source programs;

an extractor to trace said nodes in said syntax tree along an execution route of corresponding statements included in said source programs to identify an entity that is an information unit as an object of a processing in said source program and an event affecting the processing for said entity, and to store said entity into a relation table in association with said event;

a calculation unit to calculate importance degrees of entities by using data stored in said relation table;

an identification unit to identify an entity as an object of a processing affected by a specific event by using said data stored in said relation table, and calculate an influence degree of said specific event by using said importance degree of the identified entity;

a count unit to count a number of entities as objects of processings affected by said specific event by using said data stored in said relation table;

a second calculation unit to calculate an utilization degree of said specific event by using the counted number of entities; and a third calculation unit to calculate an overall importance degree of said specific event by using said utilization degree of said specific event and said influence degree of said specific event, and wherein said importance degree, said influence degree, said utilization degree and said overall importance degree are different each other.

12. A program analysis apparatus, comprising:

a syntax tree analyzer to generate a syntax tree including nodes and links between said nodes, from source programs;

an extractor to trace said nodes in said syntax tree along an execution route of corresponding statements included in said source programs to identify an entity that is an information unit as an object of a processing in said source program and entity affecting the processing for said entity, and to store said entity into a relation table in association with said event;

a counter to count a number of events affecting both of a processing for a first entity and a processing for a second entity different from said first entity;

a calculation unit to calculate an inter-entity similarity degree representing similarity between said first entity and said second entity by using the counted number of events; and a storing unit to store, upon detecting that said inter-entity similarity degree is greater than a value, data indicating said first entity and said second entity have a problem concerning similarity of entities.

13. A program analysis apparatus, comprising:

a syntax tree analyzer to generate a syntax tree including nodes and links between said nodes, from source programs;

an extractor to trace said nodes in said syntax tree along an execution route of corresponding statements included in said source programs to identify an entity that is an information unit as an object of a processing in said source program and an event affecting the processing for said entity, and to store said entity into a relation table in association with said event;

a counter to count a number of entities to be an object of a processing affected by a first event and an object of a processing affected by a second event different from said first event by using data stored in said relation table;

a calculation unit to calculate an inter-event similarity degree representing similarity between said first event and said second event by using the counted number of entities; and a storing unit to store, upon detecting that said inter-event similarity degree is greater than a value, data indicating that said first event and said second event have a problem concerning similarity of events.

\* \* \* \* \*